US011961029B2

(12) United States Patent
Jones, III et al.

(10) Patent No.: US 11,961,029 B2
(45) Date of Patent: Apr. 16, 2024

(54) SYSTEMS AND METHODS FOR ELECTRONICALLY MONITORING EMPLOYEES TO DETERMINE POTENTIAL RISK

(71) Applicant: ClearForce, Inc., Vienna, VA (US)

(72) Inventors: Jim Jones, III, Chantilly, VA (US); Norman Allen Willox, Jr., Annapolis, MD (US)

(73) Assignee: ClearForce, Inc., Vienna, VA (US)

( * ) Notice: Subject to any disclaimer, the term of this patent is extended or adjusted under 35 U.S.C. 154(b) by 0 days.

(21) Appl. No.: 17/339,512

(22) Filed: Jun. 4, 2021

(65) Prior Publication Data
US 2021/0295221 A1    Sep. 23, 2021

Related U.S. Application Data

(63) Continuation of application No. 15/248,372, filed on Aug. 26, 2016, now abandoned.

(60) Provisional application No. 62/210,744, filed on Aug. 27, 2015.

(51) Int. Cl.
    *G06Q 10/06*       (2023.01)
    *G06Q 10/0635*    (2023.01)
    *G06Q 50/00*       (2012.01)

(52) U.S. Cl.
    CPC ......... *G06Q 10/0635* (2013.01); *G06Q 50/01* (2013.01)

(58) Field of Classification Search
    CPC ...................................................... G06Q 10/06
    USPC ...................................................... 705/7.28
See application file for complete search history.

(56) References Cited

U.S. PATENT DOCUMENTS

| 7,530,105 B2 | 5/2009 | Gilbert et al. |
| 8,582,776 B2 | 11/2013 | Park |
| 8,630,820 B2 | 1/2014 | Amis |
| 8,745,759 B2 | 6/2014 | Halas |

(Continued)

OTHER PUBLICATIONS

International Search Report dated Nov. 21, 2016, issued in connection with International Application No. PCT/US2016/048935 (3 pages).

(Continued)

*Primary Examiner* — Nga B Nguyen
(74) *Attorney, Agent, or Firm* — McCarter & English, LLP

(57) ABSTRACT

Systems, methods, and computer machines for electronically monitoring an employee's behavior to identify risk are described. A method includes receiving first data from legal databases that includes information regarding legal activity relating to the employee, receiving second data from financial databases that includes financial activity relating to the employee, receiving third data relating to activities electronically conducted by the employee on a network, receiving fourth data from social networking databases that includes social networking activity conducted by the employee, aggregating the first, second, third, and fourth data into an employee profile relating to the employee, determining legally Protected Information regarding the employee from the employee profile, determining anomalies associated with the employee based on the employee profile and the legally Protected Information, and generating an alert relating to the anomalies. The alert does not reveal to the user any references to the legally Protected Information which was used to process the alert.

10 Claims, 30 Drawing Sheets

(56) References Cited

U.S. PATENT DOCUMENTS

| | | |
|---|---|---|
| 8,793,151 B2 | 7/2014 | Del Zoppo et al. |
| 9,070,088 B1 | 6/2015 | Baveja et al. |
| 10,169,607 B1 * | 1/2019 | Sheth ................ G16H 15/00 |
| 2003/0233278 A1 | 12/2003 | Marshall |
| 2004/0186852 A1 | 9/2004 | Rosen |
| 2005/0033633 A1 | 2/2005 | LaPasta et al. |
| 2005/0273453 A1 | 12/2005 | Holloran |
| 2007/0100595 A1 | 5/2007 | Earles et al. |
| 2008/0082380 A1 | 4/2008 | Stephenson |
| 2008/0271143 A1 | 10/2008 | Stephens et al. |
| 2011/0054961 A1 | 3/2011 | Del Zoppo et al. |
| 2011/0131122 A1 | 6/2011 | Griffin et al. |
| 2012/0030767 A1 | 2/2012 | Rippert, Jr. et al. |
| 2012/0109802 A1 | 5/2012 | Griffin et al. |
| 2012/0137367 A1 | 5/2012 | Dupont et al. |
| 2013/0030875 A1 * | 1/2013 | Lee ................ G06Q 30/0601 705/14.58 |
| 2013/0139229 A1 | 5/2013 | Fried et al. |
| 2013/0191898 A1 | 7/2013 | Kraft |
| 2013/0282605 A1 | 10/2013 | Noelting |
| 2014/0163333 A1 * | 6/2014 | Horseman ............ A61B 5/6897 600/301 |
| 2014/0279641 A1 | 9/2014 | Singh et al. |
| 2015/0006422 A1 | 1/2015 | Carter et al. |
| 2015/0046359 A1 | 2/2015 | Marotti et al. |
| 2016/0179814 A1 | 6/2016 | Marotti et al. |
| 2016/0343100 A1 | 11/2016 | Davenport et al. |
| 2017/0061345 A1 | 3/2017 | Jones, III et al. |

OTHER PUBLICATIONS

Written Opinion of the International Searching Authority dated Nov. 21, 2016, issued in connection with International Application No. PCT/US2016/048935 (7 pages).

International Preliminary Report on Patentability dated Feb. 27, 2018, issued in connection with International Application No. PCT/US2016/048935 (8 pages).

Ken Zawodny, "Privacy Impact Assessment for the Automated Continuing Evaluation System (ACES) Pilot", U.S. Department of Homeland Security, Apr. 9, 2007 (29 pages).

Office Action dated Aug. 23, 2018, issued in connection with U.S. Appl. No. 15/248,372 (14 pages).

Applicant Initiated Interview Summary dated Nov. 23, 2018, issued in connection with U.S. Appl. No. 15/248,372 (3 pages).

Office Action dated May 14, 2019, issued in connection with U.S. Appl. No. 15/248,372 (11 pages).

Examiner's Answer to Appeal Brief dated Jul. 22, 2020, issued in connection with U.S. Appl. No. 15/248,372 (11 pages).

Patent Board Decision on Appeal mailed Apr. 5, 2021, issued in connection with U.S. Appl. No. 15/248,372 (19 pages).

* cited by examiner

FIG. 11

Alerts *it all starts here*

Show [10] entries                                                          Search: [   ]

| Employee | Title | Type |
|---|---|---|
| Abbot D. Price | ☐ Street Brawl in Harlem | Corporate |
| Abbot D. Price | ☐ Rumble in the Woods | Corporate |
| Abbot D. Price | ☐ Wore white pants after Labor Day | Legal |
| Abigal Jennings | Married a Movie Star | Corporate |
| Abigal Jennings | | Corporate |
| Abigal Jennings | 150k is Debt Over Weekday | Financial |
| Addison K. Berry | | Corporate |
| Addison K. Berry | Test Alert Echo | Corporate |
| Addison K. Berry | | Legal |

Showing 1 to 30 of 423 entries                    Previous 1 2 3 4 5 — 43 Next

Dale Jonas
*Online*
[Investigator ▾]
Main Navigation
▦ Dashboard
○ Alerts
☐ Cases
Other
Tasks
Calender
FAQ/Help
Direct Chat
Support Activity Based Intel (ABI) — David Barn

Dashboard
My Dashboard
  Group Dashboard
Employees
Alerts
Incidents
Cases
Tasks
Calendar Events My Dashboard

Alerts

| Name | Date | Type | Confidence |
|---|---|---|---|
| Bill Smith | 10/09/2014 | Drug Related | ∨Low |
| Kenneth Kirk | 10/03/2014 | Drug Related | >Medium |
| Susan Sharp | 10/07/2014 | Public Disturbance | ∧High |

Incidents

| Name | Date | Type | Severity |
|---|---|---|---|
| Katie Smart | 10/09/2014 | Self Reported | ∨Low |
| Kim Lupe | 10/03/2014 | Peer Reported | >Low |
| Kevin Klump | 08/27/2014 | Self Reported | ∧High |

FIG. 13A

My Cases

| Name | | Type | Progress | Supervisor | Risk | Created On |
|------|---|------|----------|------------|------|------------|
| Bob O'Toole | | ☐ Technical | 25% | Jeff Thomas | ▲ High | 7/29/2014 9:32:35 PM |
| Kenneth Kirk | | ⚑ Criminal | 90% | Jeff Thomas | ▲ High | 7/29/2014 9:33:39 PM |
| Jane Blank | | $ Financial | 0% | Jeff Thomas | ▲ High | 8/12/2014 2:32:26 PM |
| Jane Smith | | ⚑ Criminal | 60% | Jeff Thomas | ▲ High | 8/12/2014 2:42:04 PM |
| Tom Lucas | | ⚑ Criminal | 100% | Bill Glover | ▲ High | 8/12/2014 2:43:06 PM |
| Mary Chi | | $ Financial | 40% | Jeff Thomas | ▲ High | 9/1/2014 4:40:09 PM |

Notifications

No Notifications Available

My Tasks

No Task Assigned

| New Alerts | Open Cases | Criminal | Financial | Technical | Monitored |
|------------|------------|----------|-----------|-----------|-----------|
| 3 | 17 | 10 | 3 | 2 | 8 |
| △13.5% | | | =0% | ▽20.7% | |

Search...

Alerts

| | Name | Date | Type | Confidence | |
|---|---|---|---|---|---|
| + | Tom Lucas | 10/09/2014 | ⬆ Drug Related | ⌄ Low | 🗒 |
| + | Jane Smith | 10/07/2014 | ⬆ Public Disturbance | ⌃ High | 🗒 |
| + | Kenneth Kirk | 10/03/2014 | ⬆ Property Related | ⌄ Medium | 🗒 |

Show 10 ⌄ Rows

Showing 1 to 3 of 3 entries

<Previous 1 2 Next>

- Activity Based Intel (ABI)
- Dashboard
- Employees
- Alerts
- Incidents
- Cases
- Tasks
- Calendar Events David Barn ▼

FIG. 16

Activity Based Intel (ABI) — David Barr

Alerts Details
Alerts / General

Results for Tom Lucus [?]

Description

Match

| Information | Charge | Location | Booked On | Released On | Parole | Confidence | Action |
|---|---|---|---|---|---|---|---|
| DL#:<br>SSN:<br>Name: Bob Zurunkie<br>DOB:<br>Aliases: | Drug Related | Seattle, WA 98905 USA | 10/9/2014 12:00:00 AM | 10/10/2014 12:00:00 AM | Yes | ⌄ Low | ⊞ |

Related Alerts

| Description | | | | | | | Action |
|---|---|---|---|---|---|---|---|
| | | | | | | | ⊡ |

Sidebar: Dashboard, Employees, Alerts, Incidents, Cases, Tasks, Calendar Events

Activity Based Intel (ABI)

- Dashboard
- Employees
- Alerts
- Incidents
- Cases
- Tasks
- Calendar Events

David Barr

Alerts

Create Incident

Show 10 Rows

| Date | | Employee | Type | Severity | |
|---|---|---|---|---|---|
| + | Tom Lucas | 09/01/2014 | Financial | Medium | |
| + | Tom Lucas | 03/05/2015 | Criminal | Medium | |
| + | Jane Smith | 7/30/2014 | Financial | Low | |
| + | Bob O'Toole | 9/02/2014 | Financial | High | |
| + | Jane Blank | 9/01/2014 | Financial | Low | |

Showing 1 to 5 of 5 entries

<Previous 1 Next>

| Activity Based Intel (ABI) | | 🔍 ⊙ 🗒 | David Barn ▼ |
|---|---|---|---|

Employees

Show [10 ▼] Rows    Search...

| | Case id ▲ | Name | Type | Progress | Risk | | | |
|---|---|---|---|---|---|---|---|---|
| + | 11 | Susan Sharp | Criminal | 100% | High | Jay Lucas | 🗐 / | |
| + | 12 | Tom Lucus | Criminal | 80% | High | Bill McConaghy | 🗐 / 📇 | |
| + | 13 | Bob O'Toole | Technical | 25% | High | N/A | 🗐 / | |
| + | 14 | Kenneth Kirk | Criminal | 90% | High | David Haas | 🗐 / 📇 | |
| + | 15 | Jane Blank | Technical | 50% | High | Bill McConaghy | 🗐 / | |
| + | 16 | Jane Blank | Technical | 75% | High | Jay Lucas | 🗐 / | |
| + | 17 | Mary Chi | Financial | 80% | High | Bill McConaghy | 🗐 / | |
| + | 18 | Kim Lupe | Financial | 40% | High | Bill McConaghy | 🗐 / | |
| + | 19 | Kenneth Kirk | Criminal | 70% | High | Bill McConaghy | 🗐 / | |
| + | 20 | Kim Lupe | Financial | 0% | High | N/A | 🗐 / | |

Showing 1 to 10 of 12 entries    <Previous [1] 2 Next>

- Dashboard
  - My Dashboard
  - Group Dashboard
- Employees
- Alerts
- Incidents
- Cases
- Tasks
- Calendar Events

FIG. 21

| ◇ Activity Based Intel (ABI) | | | | | | | David Barn ▼ |
|---|---|---|---|---|---|---|---|
| ⬡ Dashboard | Case | Employee | Current Position | Type | Risk | Cause | Supervisor |
| 👤 Employees | 12 | Bill Lucas [?] | | Criminal | ∧High | Alert | Bill McConaghy |
| ⚠ Alerts | Alert Justification | | | | | | |
| ⊙ Incidents | PII | | Charge | Location | Booked On | Released On | Parole  Identify Confirmed |
| ▭ Cases | DL#: P-000-995-854-770 SSN: 123-35-1120 Name: Bill Lucas DOB: Aliases: None | | Driving Under Influence | Your Street 12345 St Charles | 6/6/2003 4:10:00PM | 6/6/2014 3:03:00PM | Yes  ∧High |

Mini-Investigation

[████████ 80%]

| Task | | | Status |
|---|---|---|---|
| Step 1) Determine Employee Status Notify employee that they are on suspension until cases is finalized | | | Completed |
| Alleged Conduct | Employee Status | Action Taken: True • Suspended:True • Computer Seized:True • Network Access Revoked: True • Additional Actions: None provides | Suspension |
| Seriousness: 0 JobRelated: False | | | Start 7/28/2014 12:00:00 AM End: 8/31/2014 12:00:00 AM |
| | | Action Taken: True • Suspended:True • Computer Seized:True | Suspension |
| Seriousness: 0 JobRelated: False | | | Start 7/24/2014 12:00:00 AM End: 8/6/2014 12:00:00 AM |

📅 Calendar Events

FIG. 22A

| | | |
|---|---|---|
| Seriousness: 0<br>JobRelated: False | Action Taken: True<br>• Suspended: True<br>• Computer Seized: False<br>• Network Access Revoked: True<br>• Additional Actions: | • Network Access Revoked: True<br>• Additional Actions: None provides |
| Step 2) Initial Review<br>Review incident report about employee | | Start 7/29/2014 12:00:00 AM<br>End: 8/15/2014 12:00:00 AM |
| Evidence Supporting Arrest<br>YouTube video | Employee Statement<br>They said they didn't do it | Supervisor Statement<br>Pretty sure he did it |
| N/A | Left the building | N/A | Completed |
| Step 3) Review Arrest Report<br>Review arrest report on incident | | | Completed |

FIG. 22B

| Activity Based Intel (ABI) | | 🔍 | 📄 💿 📋³ 📋 | | 👤 David Barn▼ |
|---|---|---|---|---|---|

Dashboard
Employees
Alerts
Incidents
Cases
Tasks
Calendar Events

Step 4) Contact Arresting Officer — Completed
Contact arresting officer about case

| Name | Phone | Email | Time of Conversation | Type of Conversation | Notes |
|---|---|---|---|---|---|
| Kevin Smith | (253) 123-4567 | ksmith@123police.net | 6/30/2014 12:00:00 AM | Phone | N/A |

Step 5) Contact Attorneys — Completed
Contact Prosecutor about case

Prosecutor Attorney    Defense Attorney

Name: Chris Mircle    Name: Henery Conner
Phone: (855) 567-5555    Phone: (837) 588-1234
Email: CM@Legalguys.net    Email: ConnerH@email.net
Time of Conversation: 7/23/2014 12:00:00AM    Time of Conversation: 7/8/2014 12:00:00AM
Type of Conversation: Phone    Type of Conversation: Phone
Notes:    Notes:
N/A    N/A Step 6) Contact Witnesses — Completed
Speak with any available witnesses - Create list by last name.

| Witness Name | Phone Number | Email | Contact Date | Contact Types | Witness Types | Details |
|---|---|---|---|---|---|---|
| James Peterson | (123) 888-0000 | JP@email.com | 7/10/2014 12:00:00 AM | N/A | | Saw this person running from the scene |

Step 7) Internet Search — Completed
Perform an internet search for any media coverage regarding the arrest.

| Source | Media Content | Dates of Publication |
|---|---|---|
| Social Media App 1 http://www.social1.com/MrFriendly.1234 | Post of being in a Secure area | 10/20/2014 12:00:00 AM |

FIG. 23

Step 8) Interview Employee
Schedule a one on one interview employee

| Interview Date | People in Meeting | Admit to Charges | Intentional | Mitigating Circumstances | Employee Statement | Notes | |
|---|---|---|---|---|---|---|---|
| 7/30/2014 12:00:00 AM | Bill Lucas Jay Lucas | False | False | N/A | N/A | Employee was candid and forthcoming | Completed |

Step 9) Prepare Findings
Collect all information of findings on employee

| | | | |
|---|---|---|---|
| Generate Report | Emailed to | | Ongoing |
| | HR@dynology.com;legalguys@general.email.com | | |

Step 10) Make Determination
Final a Determination based on credible allegations of wrongdoing and job relatedness: Hire/No Hire Applicant, Terminate/Continue, or Current Employee

| Action Taken | Summary | Completed By | Completed Date | |
|---|---|---|---|---|
| Employee was terminated. | He resisted so we tazed him and used pepper spray for good measure. | Bill McConaghy | 7/28/2014 8:29:34 PM | Ongoing |

Search...

FIG. 24

Task List

Activity Based Intel (ABI) — David Barry

- Dashboard
  - My Dashboard
  - Group Dashboard
- Employees
- Alerts
- Incidents
- Cases
- Tasks
- Calendar Events

[Create Task]

Show [10 ▼] Rows     Search...

| | Type | Subject | Due Date | Priority | |
|---|---|---|---|---|---|
| + | Administrative | Review cases | 8/1/2014 12:00:00 AM | High | ✎ |
| + | Administrative | Meeting Room #112 | 9/17/2014 12:00:00 AM | High | ✎ |
| + | Administrative | Update employee case details | 2/12/2015 12:00:00 AM | Normal | ✎ |
| + | Complete Adjudication | Contact new witness | 7/31/2014 12:00:00 AM | Low | ✎ |
| + | Complete Adjudication | Check on case | 7/7/2014 12:00:00 AM | Low | ✎ |
| + | Complete Adjudication | Finish up Chi | 10/8/2014 12:00:00 AM | Low | ✎ |
| + | Other | Talk to Andrew about Comments | 10/8/2014 12:00:00 AM | Low | ✎ |

Showing 1 to 7 of 7 entries     <Previous [1] Next>

FIG. 25

SYSTEMS AND METHODS FOR ELECTRONICALLY MONITORING EMPLOYEES TO DETERMINE POTENTIAL RISK

CROSS-REFERENCE TO RELATED APPLICATIONS

The present application is a continuation application of, and claims benefit of priority to, U.S. patent application Ser. No. 15/248,372 filed on Aug. 26, 2016, which claims priority to U.S. Provisional Patent Application Ser. No. 62/210,744, filed Aug. 27, 2015 and entitled "SYSTEM AND METHOD FOR DETECTING AN EMPLOYEE-RELATED RISK," the contents of which applications are expressly incorporated herein by reference in their entireties.

TECHNICAL FIELD

The present specification generally relates to systems and methods for monitoring employee activity and, more specifically, to systems and methods for determining whether a combination of monitored activity and other factors of an employee pose a risk to an organization, its employees and customers.

BACKGROUND

Certain organizations may be susceptible to adverse actions that are taken by people who have access to various resources owned and/or operated by the organization, regardless of whether the adverse actions are intentional. As such, organizations may monitor every person's activity, both offline and online within the organization's network, as well as activity outside the organization's network when the activity is conducted on a device owned by the organization.

Since certain activity may not appear to be adverse in a vacuum, organizations may rely on services for monitoring other online and offline activity, including background checks, to determine whether the activity or other behavior is actually adverse to the organization's interest. However, some of this additional activity may be legally protected ("Protected Information") and potentially subject to compliance with federal and state laws regarding privacy, which may prevent the use of Protected Information to exercise an administrative action. Furthermore, background screening is typically limited to historic data at a particular point in time instead of continuously obtained information.

Accordingly, a need exists for systems and methods that continually monitor individuals for adverse activity toward an organization and which provides a risk assessment that is compliant with federal and state laws and regulations.

SUMMARY

In an embodiment, a method of electronically evaluating a behavior of an employee to identify risk includes receiving, by a processing device, first data from one or more legal databases. The first data includes information regarding legal activity relating to the employee. The method further includes receiving, by the processing device, second data from one or more financial databases. The second data includes financial activity relating to the employee. The method further includes receiving, by the processing device, third data relating to one or more activities electronically conducted by the employee on a network communicatively coupled to the processing device and fourth data from one or more social networking databases. The fourth data includes social networking activity conducted online by the employee. The method further includes aggregating, by the processing device, the first data, the second data, the third data, and the fourth data into an employee profile relating to the employee, determining, by the processing device, legally Protected Information regarding the employee from the employee profile, determining, by the processing device, one or more anomalies associated with the employee based on the employee profile and the legally Protected Information, and generating, by the processing device, an alert relating to the one or more anomalies. The alert does not reveal to the user any references to the legally Protected Information which was used to process the alert.

In an embodiment, a system of electronically evaluating a behavior of an employee to identify risk includes a processing device and a non-transitory, processor-readable storage medium. The non-transitory, processor-readable storage medium includes one or more programming instructions that, when executed, cause the processing device to receive first data from one or more legal databases. The first data includes information regarding legal activity relating to the employee. The non-transitory, processor-readable storage medium further includes one or more programming instructions that, when executed, cause the processing device to receive second data from one or more financial databases. The second data includes financial activity relating to the employee. The non-transitory, processor-readable storage medium further includes one or more programming instructions that, when executed, cause the processing device to receive third data relating to one or more activities electronically conducted by the employee on a network communicatively coupled to the processing device and fourth data from one or more social networking databases. The fourth data includes social networking activity conducted by the employee. The non-transitory, processor-readable storage medium further includes one or more programming instructions that, when executed, cause the processing device to aggregate the first data, the second data, the third data, and the fourth data into an employee profile relating to the employee, determine legally Protected Information regarding the employee from the employee profile, determine one or more anomalies associated with the employee based on the employee profile and the legally Protected Information, and generate an alert relating to the one or more anomalies. The alert does not reveal to the user any references to the legally Protected Information which was used to process the alert.

In an embodiment, a computer machine for electronically evaluating a behavior of an employee to identify risk includes a first hardware component that receives first data from one or more legal databases, second data from one or more financial databases, third data from a network communicatively coupled to the first hardware component, and fourth data from one or more social networking databases. The first data includes information regarding legal activity relating to the employee, the second data includes financial activity relating to the employee, the third data relates to one or more activities electronically conducted by the employee on the network, and the fourth data includes social networking activity conducted by the employee. The computer machine further includes a second hardware component that aggregates the first data, the second data, the third data, and the fourth data into an employee profile relating to the employee, a third hardware component that determines legally Protected Information regarding the employee from the employee profile and determines one or more anomalies associated with the employee based on the employee profile and the legally Protected Information, and a fourth hardware component that generates an alert relating to the one or more anomalies. The alert does not contain references to the legally Protected Information.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 11 depicts an illustrative screen shot of an alerts user interface for an investigator user according to one or more embodiments shown and described herein;

FIG. 13A depicts an illustrative screen shot of a first section of a homepage portion of the user interface according to one or more embodiments shown and described herein;

FIG. 13B depicts an illustrative screen shot of a second section of the homepage portion of the user interface of FIG. 13A.

FIG. 14 is depicts an illustrative screen shot of another homepage portion of the user interface according to one or more embodiments shown and described herein;

FIG. 15 depicts an illustrative screen shot of a page showing a list of employees according to one or more embodiments shown and described herein;

FIG. 16 depicts an illustrative screen shot of a page showing generated alerts according to one or more embodiments shown and described herein;

FIG. 17 depicts an illustrative screen shot of a page showing alert details for a specific employee according to one or more embodiments shown and described herein;

FIG. 18 depicts an illustrative screen shot of a page showing recorded incidents according to one or more embodiments shown and described herein;

FIG. 19 depicts an illustrative screen shot of a page showing incident results for specific personnel according to one or more embodiments shown and described herein;

FIG. 20 depicts an illustrative screen shot of a page showing incident results for another personnel according to one or more embodiments shown and described herein;

FIG. 21 depicts an illustrative screen shot of a page showing managed cases according to one or more embodiments shown and described herein;

FIG. 22A depicts an illustrative screen shot of a first portion of a page showing a specific case according to one or more embodiments shown and described herein;

FIG. 22B depicts an illustrative screen shot of a second portion of the page depicted in FIG. 22A;

FIG. 23 depicts an enlarged view of a bottom portion of the page shown in FIG. 22;

FIG. 24 depicts an enlarged view of an end portion of the page shown in FIG. 23; and FIG. 25 depicts an illustrative screen shot of a page showing a list of tasks according to one or more embodiments shown and described herein.

DETAILED DESCRIPTION

Figure 1:
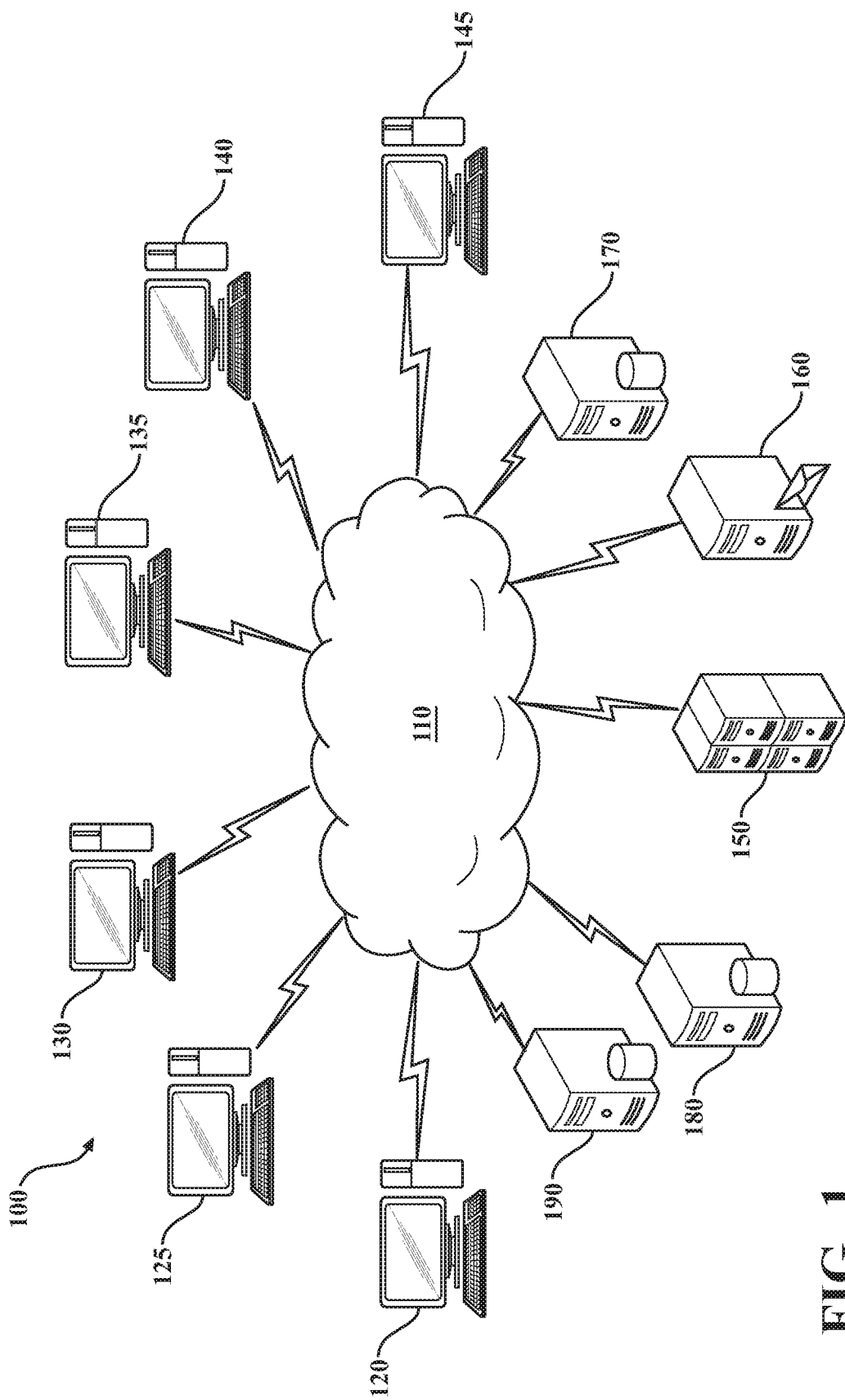
FIG. 1 schematically depicts an illustrative computing network for monitoring one or more individuals on a network, determining risk, and providing tools for mitigating risk according to one or more embodiments shown and described herein.

The embodiments described herein are generally directed to systems and methods that monitor the actions of one or more employees on an organization's network and receive information from external sources to determine whether any anomalies exist that might result in actions that are or could potentially be adverse to the organization's interests. If an anomaly is detected, an alert may be generated and supplied to one or more other users for further investigation and/or potential adverse or corrective action. The information that is received from external sources includes legally Protected Information, which is used in determining whether an anomaly is detected. However, to protect the employee's privacy rights in compliance with federal and state laws, the alert that is generated and supplied (either alone or as part of a report) does not contain any of the legally Protected Information so as to avoid having the legally Protected Information improperly used by the users in deciding how to respond to the alert. In addition to the foregoing, the systems and methods described herein may provide a user interface to the one or more other users for responding to the alert, which may be specifically tailored for each of the one or more other users based on the user's role in responding to the alert.

Employees of the organization may intentionally or inadvertently cause risk to the organization by providing access to any of the organization's resources and/or property, stealing from the organization, causing harm to come to the organization's assets and/or other individuals associated with the organization, and/or the like. Such actions may occur as a result of factors or events taking place in the employee's personal life, financial distress, work dissatisfaction, and may be evidenced or predicted by activities and behaviors conducted by the employee. The employee's actions may place an organization at risk in many ways, including damaging the organization's brand, reputation, and name; stealing or otherwise harming the organization financially; compromising the organization's intellectual property; and an employee's actions within the organization (e.g., in the workplace) may cause other employees physical harm, or otherwise create a hostile environment. It is known that certain factors in an employee's life can be indicative of future adverse actions or future criminal behavior.

In a non-limiting example of how an employee may harm an organization, the employee may intentionally or unintentionally be responsible for data breaches, which can result in the loss or copying of sensitive data held by an organization. The acquisition of such data by third parties can be used to commit criminal acts or cause harm to the organization. That is, data breaches can cause an organization to lose revenue or suffer other damages for which recovery may be impossible or difficult. Some of these risks may be mitigated by observing the employee's actions, life events, behavior, financial activity, legal activity (e.g., law enforcement and judicial activity), and/or the like, and taking action as soon as possible, which may be even before the individual executes a threat to the organization. For example, the individual may lose his/her access to sensitive information, be fired, reprimanded, provided with counseling, transferred, educated, and/or the like. The systems and methods described herein address these issues in a manner that provides a more accurate correlation of behavior to criminal acts while providing the employer with a compliant, repeatable workflow and process that protects the privacy of the employees, and helps protect the organization against potential inadvertent unlawful employment practice(s).

As used herein, an "organization" generally refers to any entity that has a plurality of individuals associated therewith. As such, an organization may include, but is not limited to, a place of business, a government entity, a charitable organization, a financial institution, an educational institution, a medical institution, an interest group, and/or the like.

An "employee" as used herein generally relates to an individual that is not only employed by an organization, but is also associated with an organization in such a manner as to have access to the organization's proprietary information, which may include, but is not limited to, an owner, a member, an elected official, a volunteer, a contractor, an authorized individual, a teacher, a student, an agent and/or the like. The employee may come in contact with, or have access to, resources owned and/or operated by the organization, networked or standalone computers, buildings owned and/or occupied by the organization, tangible goods owned by the organization, funds, data, intellectual property, and/or the like.

As used herein, "legally Protected Information" refers to information pertaining to an employee to which the employee has an expectation of privacy. As such, the legally Protected Information includes Regulated Data, which is data that is protected from public disclosure by various laws, rules, policies, and/or the like, and cannot be divulged without express authorization from the employee. Non-limiting examples of laws, rules, policies, and/or the like include laws enacted by the Fair Credit Reporting Act (FCRA), the Health Insurance Portability and Accountability Act (HIPAA), and the Gramm-Leach-Bliley Act (GLBA). In some embodiments, the Regulated Data may only be regulated based on how it is used (e.g., data that is obtained under the FCRA). That is, some public data may not be used for disciplinary purposes, even if such data is public. Such data may be considered Regulated Data in these instances. Moreover, the Regulated Data may not be used for the purposes of disciplinary action or the like against the employee. Other illustrative examples of legally Protected Information include, but are not limited to, financial records (including credit reports or the like), medical records, certain legal records, private information held regarding the employee (i.e., personally identifiable information), and/or the like.

As used herein, a "user" is an individual that reviews and processes any alerts generated by the methods or systems described herein, to include initiating an external review of an employee, interviewing an employee, or taking disciplinary action against the employee. A user may be an employee of the organization or may be an individual employed by an organization providing risk assessment services. The term user may secede another term, such as "administrative," "investigator," "decision maker," "reviewer," or "analyst" or the like so as to distinguish between the different roles a user performs.

As used herein, the term "anomaly" generally refers to received data or information regarding an employee that deviates from expected information regarding that employee. As such, a baseline regarding the employee's behavior is established such that the systems and methods described herein can determine whether an anomaly exists when information or data is received. Such a baseline is established by analyzing an employee's behavior and determining what is considered normal or typical for that employee.

FIG. 1 depicts an illustrative computing network 100 that is used to monitor an employee's activity, obtain information regarding the employee, and generate an alert if anomalies are discovered according to embodiments shown and described herein. As illustrated in FIG. 1, a computer network 110 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 110 may generally be configured to electronically connect one or more computing devices and/or components thereof. Illustrative computing devices may include, but are not limited to, one or more computing devices, such as an investigator user computing device 120, a reviewer user computing device 125, an administrative user computing device 130, an analyst user computing device 135, a decision maker user computing device 140, and a general user computing device 145 and/or one or more server computing devices, such as an application server 150, a mail transfer server 160, an external source database server 170, a client database server 180, and a core database server 190. Other computing devices not specifically recited should generally be understood.

The user computing devices may each generally be used as an interface between a user and the other components connected to the computer network 110, and/or various other components communicatively coupled to the user computing devices (such as components communicatively coupled via one or more networks to the user computing devices), whether or not specifically described herein. Thus, the user computing devices may be used to perform one or more functions, such as receiving one or more inputs from a user or providing information to the user. Additionally, in the event that one or more of the server computing devices requires oversight, updating, or correction, one or more of the user computing devices may be configured to provide the desired oversight, updating, and/or correction. One or more of the user computing devices may also be used to input additional data into a data storage portion of one or more of the server computing devices.

As will be described in greater detail herein, each of the user computing devices may be specifically configured for a particular user or may be a general computer that can be particularly configured for any one of the particular users described herein. For example, the investigator user computing device 120 may provide a user interface for an investigator user, the reviewer user computing device 125 may provide a user interface for a reviewer user, the administrative computing device 130 may provide a user interface for an administrative user, the analyst user computing device 135 may provide a user interface for an analyst user, the decision maker user computing device 140 may provide a user interface for a decision maker user, and the general user computing device 145 may be used to provide any user interface, including a user interface described herein. In some embodiments, the general computing device 145 may be a computing device that is monitored for target employee activities.

The various server computing devices may each receive electronic data and/or the like from one or more sources (e.g., one or more of the user computing devices, one or more external feeds/sources, and/or one or more databases), direct operation of one or more other devices (e.g., one or more of the user computing devices), contain data relating to employee activity, contain legally Protected Information, contain social networking data, legal activity (e.g., law enforcement and judicial activity) data, financial data, information regarding one or more factors associated with an employee, risk assessment data, behavior model data and/or the like. In some embodiments, one or more of the various server computing devices may contain employee-specific information for each of a plurality of employees, including, but not limited to, information relating to at least one of a property owned by the employee, information regarding utilities used by the employee, information regarding travel completed by the employee, information regarding a club membership held by the employee, information regarding a political affiliation of the employee, information regarding a religious affiliation of the employee, information regarding a group membership held by the employee, information regarding a subscription held by the employee, information regarding a previous employment of the employee, information regarding a publication made by the employee, information regarding a license held by the employee, information regarding a registration held by the employee, and/or the like, as described in greater detail herein. In some embodiments, the information that is obtained may be also used to establish a baseline of typical or expected activity for a particular employee for the purposes of determining whether an anomaly exists, as described in greater detail herein.

It should be understood that while the user computing devices are depicted as personal computers and the server computing devices are depicted as servers, these are non-limiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing devices and the server computing devices may represent a plurality of computers, servers, databases, mobile devices, components, and/or the like.

In addition, it should be understood that while the embodiments depicted herein refer to a network of devices, the present disclosure is not solely limited to such a network. For example, in some embodiments, the various processes described herein may be completed by a single computing device, such as a non-networked computing device or a networked computing device that does not use the network to complete the various processes described herein.

Figure 2A:
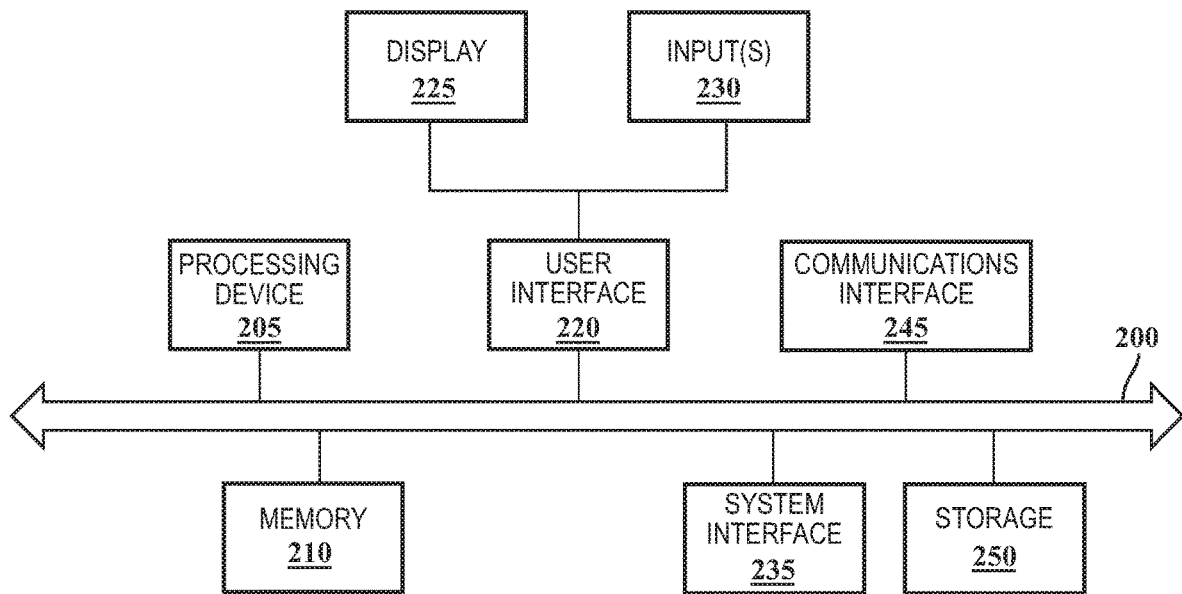
FIG. 2A schematically depicts a block diagram of illustrative hardware of a computing device that monitors one or more individuals on a network, determines risk, and provides tools for mitigating risk according to one or more embodiments shown and described herein.

Illustrative hardware components of one of the user computing devices and/or the server computing devices are depicted in FIG. 2A. A bus 200 may interconnect the various components. A processing device 205, such as a computer processing unit (CPU), may be the central processing unit of the computing device, performing calculations and logic operations required to execute a program. The processing device 205, alone or in conjunction with one or more of the other elements disclosed in FIG. 2A, is an illustrative processing device, computing device, processor, or combination thereof, as such terms are used within this disclosure. Memory 210, such as read only memory (ROM) and random access memory (RAM), may constitute an illustrative memory device (i.e., a non-transitory processor-readable storage medium). Such memory 210 may include one or more programming instructions thereon that, when executed by the processing device 205, cause the processing device 205 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

Figure 2B:
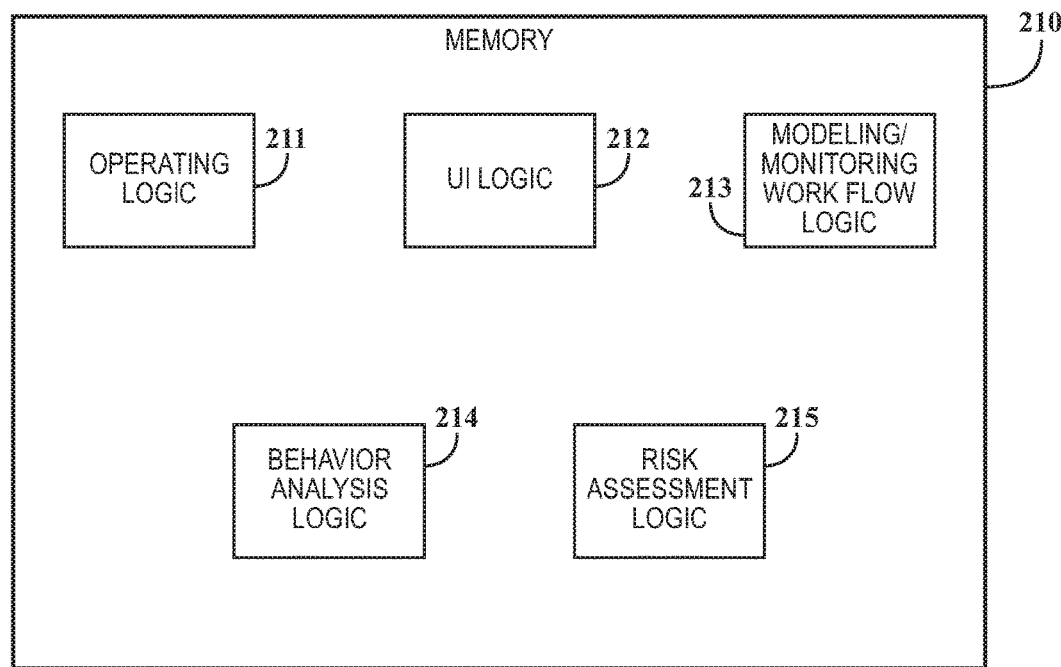
FIG. 2B schematically depicts a block diagram of software modules contained within a memory of a computing device according to one or more embodiments shown and described herein.

In some embodiments, the program instructions contained on the memory 210 may be embodied as a plurality of software modules, where each module provides programming instructions for completing one or more tasks. For example, as shown in FIG. 2B, the memory 210 may contain operating logic 211, user interface (UI) logic 212, modeling/monitoring/workflow logic 213, behavior analysis logic 214, and/or risk assessment logic 215. These are merely illustrative examples, and alternative and/or additional logic modules may also be used to carry out the processes described herein. In addition, the various processes described herein may be completed by a combination of modules, and are not limited to a single specific module. The operating logic 211 may include an operating system and/or other software for managing components of a computing device. The UI logic 212 may include one or more software modules for providing a user interface to a user, including, but not limited to, an investigator user interface, a reviewer user interface, an administrative user interface, an analyst user interface, a decision maker user interface, and/or the like, as described m greater detail herein. The modeling/monitoring/workflow logic 213 may include one or more software modules for monitoring employee activity, generating models, or providing a workflow, as described in greater detail herein. The behavior analysis logic 214 may include one or more software modules for analyzing an employee's behavior based on the employee's activity within the organization's network and/or based on information obtained from one or more internal or external sources, and/or generating a behavior model, as described in greater detail herein. The risk assessment logic 215 may include one or more software modules for determining risk based on a particular employee's behavior, providing a risk assessment, determining one or more anomalies, and/or generating one or more reports.

Referring again to FIG. 2A, a storage device 250, which may generally be a storage medium that is separate from the memory 210, may contain one or more data repositories for storing data that is used for evaluating a manufactured part and/or determining a manufactured part transformation. The storage device 250 may be any physical storage medium, including, but not limited to, a hard disk drive (HDD), memory, removable storage, and/or the like. While the storage device 250 is depicted as a local device, it should be understood that the storage device 250 may be a remote storage device, such as, for example, a remote server or the like.

Figure 2C:
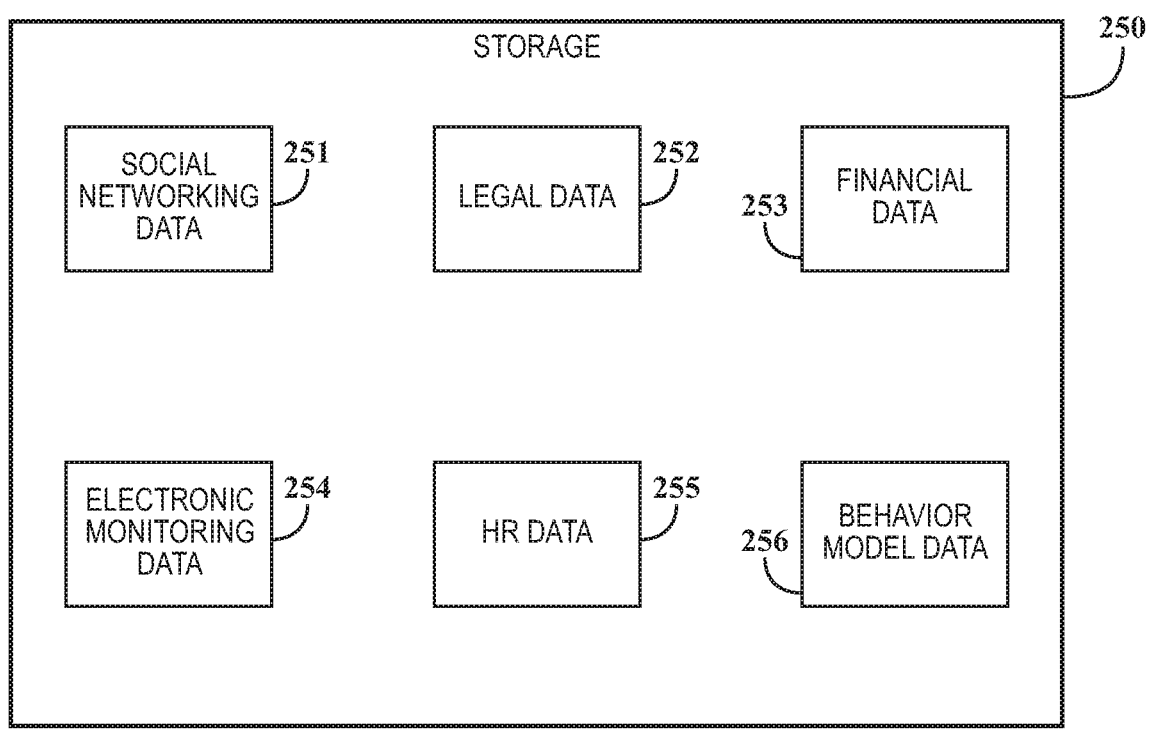
FIG. 2C schematically depicts a block diagram of various data contained within a data storage component of a computing device according to one or more embodiments shown and described herein.

Illustrative data that may be contained within the storage device 250 is depicted in FIG. 2C. As shown in FIG. 2C, the storage device 250 may include, for example, social networking data 251, legal data 252 (e.g., law enforcement and judicial data), financial data 253, electronic monitoring data 254, human resources (HR) data 255, behavior model data 256, and/or the like. Social networking data 251 may include, for example, data that is obtained from one or more social networking sources. The social networking source is not limited by this disclosure and may be any existing or future social network that provides access to the information generated therein. In some embodiments, social networking data 251 may include data that is obtained via one or more social networking feeds (e.g., feeds are monitored for relevant data, which is downloaded when discovered). Legal data 252 may include, for example, data obtained from one or more of a law enforcement agency database, a judicial database, a regulated public records database, a regulated public information database, and/or the like. In some embodiments, the legal data 252 may be referred to as law enforcement and/or judicial data. Financial data 253 may include, for example, data obtained from one or more of a credit reporting database, a bankruptcy database, a real property record database, a consumer reporting agency database, a financial institution database, and/or the like. Electronic monitoring data 254 may include, for example, data that is generated from electronic monitoring of an employee's activities while the employee is logged into an organization's private network and/or using an electronic device (such as a computing device, a mobile device, or the like) that is owned and/or maintained by an organization. Thus, electronic monitoring data 254 may include, but is not limited to, browsing history, file transfer history, file editing history, communications data (e.g., email and voicemail data), keylogging and/or keystroke data, mouse click data, screen shot data, peripheral device access data, video monitoring data, and/or the like. Human resource (HR) data 255 may include, for example, data that is generally collected and/or maintained by a human resources department in embodiments where the organization is an employer and a target employee (i.e., an employee for whom data is being collected) is an employee, contractor, consultant, counsel, or the like. Thus, the HR data 255 may include one or more factors associated with an employee, including, but not limited to, a job category of the employee, a responsibilities category of the employee, a prior history of the employee, a performance review of the employee, a ranking of the employee, a written complaint regarding the employee, an award received by the employee, and/or the like. Behavior model data 256 may include, for example, data relating to an employee's behavior that may be used to generate a model and/or data relating to the generated behavior model, as described in greater detail herein.

Referring again to FIG. 2A, an optional user interface 220 may permit information from the bus 200 to be displayed on a display 225 portion of the computing device in audio, visual, graphic, or alphanumeric format. Moreover, the user interface 220 may also include one or more inputs 230 that allow for transmission to and receipt of data from input devices such as a keyboard, a mouse, a joystick, a touch screen, a remote control, a pointing device, a video input device, an audio input device, a haptic feedback device, and/or the like. Such a user interface 220 may be used, for example, to allow a user to interact with the computing device or any component thereof.

A system interface 235 may generally provide the computing device with an ability to interface with one or more of the components of the computer network 110 (FIG. 1). Communication with such components may occur using various communication ports (not shown). An illustrative communication port may be attached to a communications network, such as the Internet, an intranet, a local network, a direct connection, and/or the like.

A communications interface 245 may generally provide the computing device with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated m FIGS. 2A-2C are merely illustrative and are not intended to limit the scope of this disclosure. More specifically, while the components in FIGS. 2A-2C are illustrated as residing within one or more of the server computing devices and/or one or more of the user computing devices, these are non-limiting examples. In some embodiments, one or more of the components may reside external to the one or more server computing devices and/or the one or more user computing devices. Similarly, one or more of the components may be embodied in other computing devices not specifically described herein.

Figure 3:
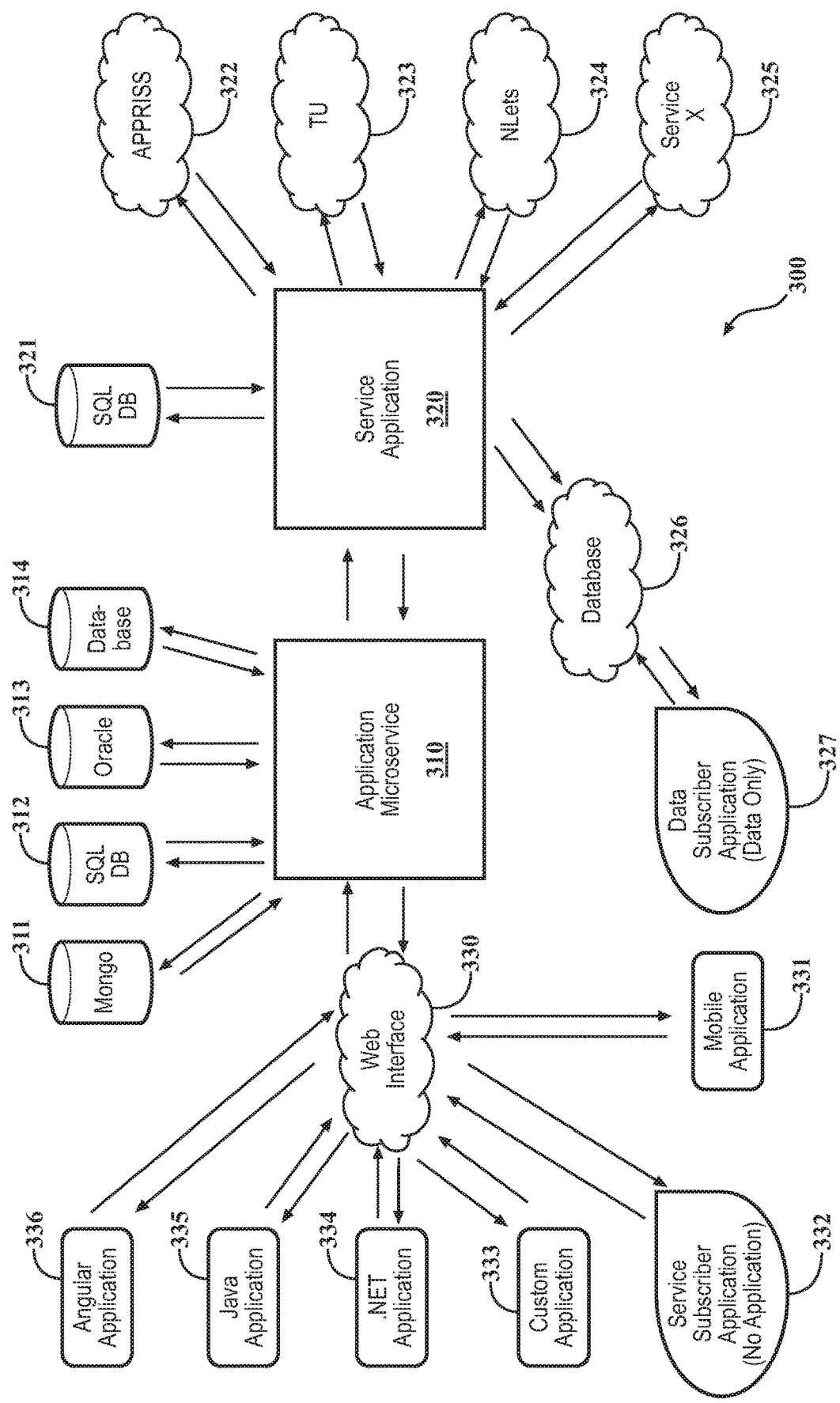
FIG. 3 schematically depicts a block diagram of an illustrative architecture of a system for monitoring one or more individuals on a network, determining risk, and providing tools for mitigating risk according to one or more embodiments shown and described herein.

The systems and methods described herein may generally provide user facing and backend portions for the purposes of monitoring an employee, receiving data, determining anomalies and assessing risk, generating behavior models, and providing reports, alerts, and risk assessments. For example, a user facing portion may be used to monitor an employee, receive data from an employee, provide reports, alerts, and risk assessments to a user and a backend portion may be used to receive data from non-organizational sources (e.g., external sources), determining anomalies and assessing risk, and generating behavior models. FIG. 3 depicts a block diagram of an illustrative architecture for providing the various user facing and backend portions.

An application microservice 310, which is a service-oriented architecture, may provide the user-facing portion of the systems and methods described herein. The application microservice 310 may interface with one or more databases, such as, for example, a MongoDB 311, a structured query language (SQL) database (DB) 312, an Oracle DB 313, and/or any other database 314 now known or later developed. The one or more databases may store data relating to user-facing functions, including user interfaces, user activity tracking data, and/or the like, as described in greater detail herein.

In some embodiments, the application microservice 310 may provide a web interface 330 for user-facing functions, such as the various user-facing functions described herein. Such user-facing functions may be provided by one or more applications that are tailored for a specific use or a specific purpose. Illustrative examples of the one or more applications include, but are not limited to, a mobile application 331, a service subscriber application 332, a custom application 333, a .NET application, a Java application 335, and an angular application 336. The mobile application 331 may provide a specific user interface that is customized for user computing devices that are mobile devices. The service subscriber application 332 and/or the custom application 333 may each provide a particular user interface and/or custom interface based on the type of user, as described in greater detail herein. The .NET application 334 refers to a specific application interface that functions in a Microsoft® Windows® environment. The Java application 335 and the angular application 336 each refers to a specific application interface that functions in a Java Runtime Environment (JRE), such as via a web browser plugin.

The backend portion of the systems and methods described herein may be provided, for example, by a service application 320. The service application 320 may interface with a plurality of sources, databases, live feeds, and/or the like to obtain information, determine anomalies and assess risk, generate behavior models, and/or the like. Illustrative sources, databases, life feeds, and/or the like include, but are not limited to, an SQL database 321, an Appriss® source 322, a credit reporting agency source 323 (e.g. TransUnion® (TU)), an international justice and public safety network (NLETS) source 324, a data service source 325, and a database source 326, which may, in turn, interface with a data subscriber application 327.

Figure 4:
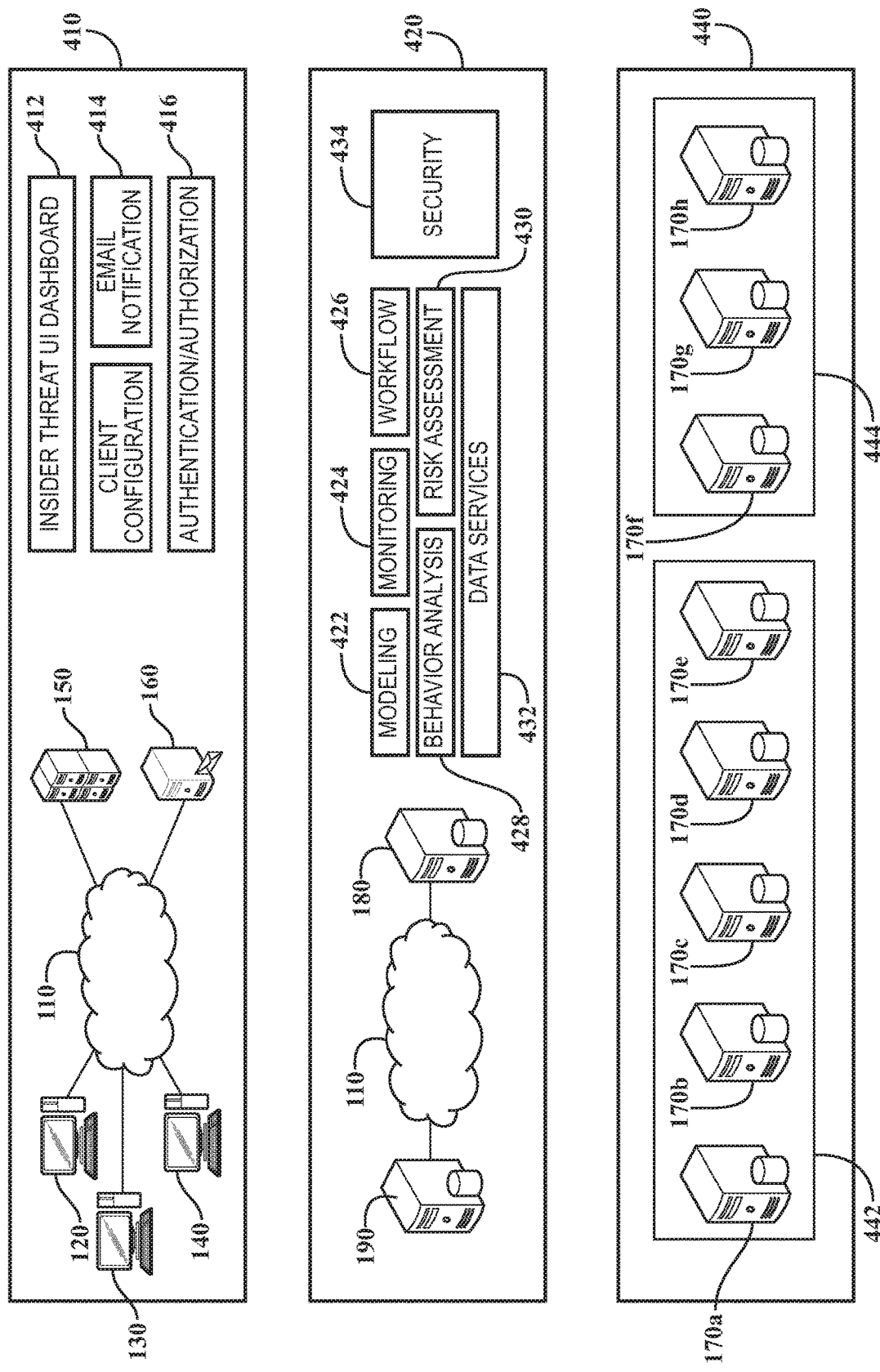
FIG. 4 schematically depicts an illustrative system architecture along with various system components necessary for monitoring one or more individuals on a network, determining risk, and providing tools for mitigating risk according to one or more embodiments shown and described herein.

FIG. 4 depicts a topology diagram of an illustrative example of a system architecture along with various components of the computer network 110 (FIG. 1) that are used in providing an application as described herein. In some embodiments, the system architecture may include a client presentation layer 410, an application/code/logic/data layer 420, and/or an external data source layer 440.

The client presentation layer 410 is responsible for serving web pages (e.g., hypertext markup language (HTML) pages) via a hypertext transfer protocol (HTTP) to clients. The client presentation layer 410 sends out web pages in response to requests from browsers. A page request is generated when a client clicks a link on a web page in the browser.

The client presentation layer 410 may include, for example, one or more of the user computing devices (such as, but not limited to, the investigator user computing device 120, the administrative user computing device 130, and the decision maker user computing device 140) communicatively coupled via the computer network 110 to the application server 150 and/or the mail transfer server 160 such that the servers provide an insider threat user interface dashboard 412, a client configuration application 414, an email notification application 416, and/or an authentication/authorization application 418. These applications may generally provide the user computing devices with one or more user interfaces for logging into the system, reviewing potential threats that have been discovered/determined, configure various personal settings, and/or to receive emails containing alerts, and/or the like, as described in greater detail herein.

The application/code/logic/data layer 420 presents application logic and data services. In addition, the application/code/logic/data layer 420 hosts business logic, business model classes and a back end database. The application/code/logic/data layer 420 may include, for example, a plurality of server computing devices (such as, but not limited to, the client database server 180 and the core database server 190) communicatively coupled to one another via the computer network 110. The server computing devices may provide a modeling application 422, a monitoring application 424, a workflow application 426, a behavior analysis application 428, a risk assessment application 430, a data services application 432, and/or a security application 434. These applications may generally allow the systems and methods described herein to monitor an employee, analyze received data, generate alerts, generate risk assessments, generate behavior models, determine legally Protected Information to ensure that such legally Protected Information is not provided to a user via the client presentation layer 410, and/or the like, as described in greater detail herein.

The external data source layer 440 generally transfers data to the application/code/logic/data layer 420. As such, the external data source layer 440 includes (or interfaces with) external source database servers 170 (FIG. 1) that provide data that is used for the purposes of analyzing data about a particular employee, generate alerts, generate behavior models, determine legally Protected Information, and/or the like. The data that is provided from these external source database servers 170 includes, but is not limited to, social networking activity data, legal activity data, financial activity data, and/or data containing other information about an employee, such as information relating to at least one of a property owned by the employee, information regarding utilities used by the employee, information regarding travel completed by the employee, information regarding a club membership held by the employee, information regarding a group membership held by the employee, information regarding a subscription held by the employee, information regarding a previous employment of the employee, information regarding a publication made by the employee, information regarding a license held by the employee, and information regarding a registration held by the employee.

Figure 5:
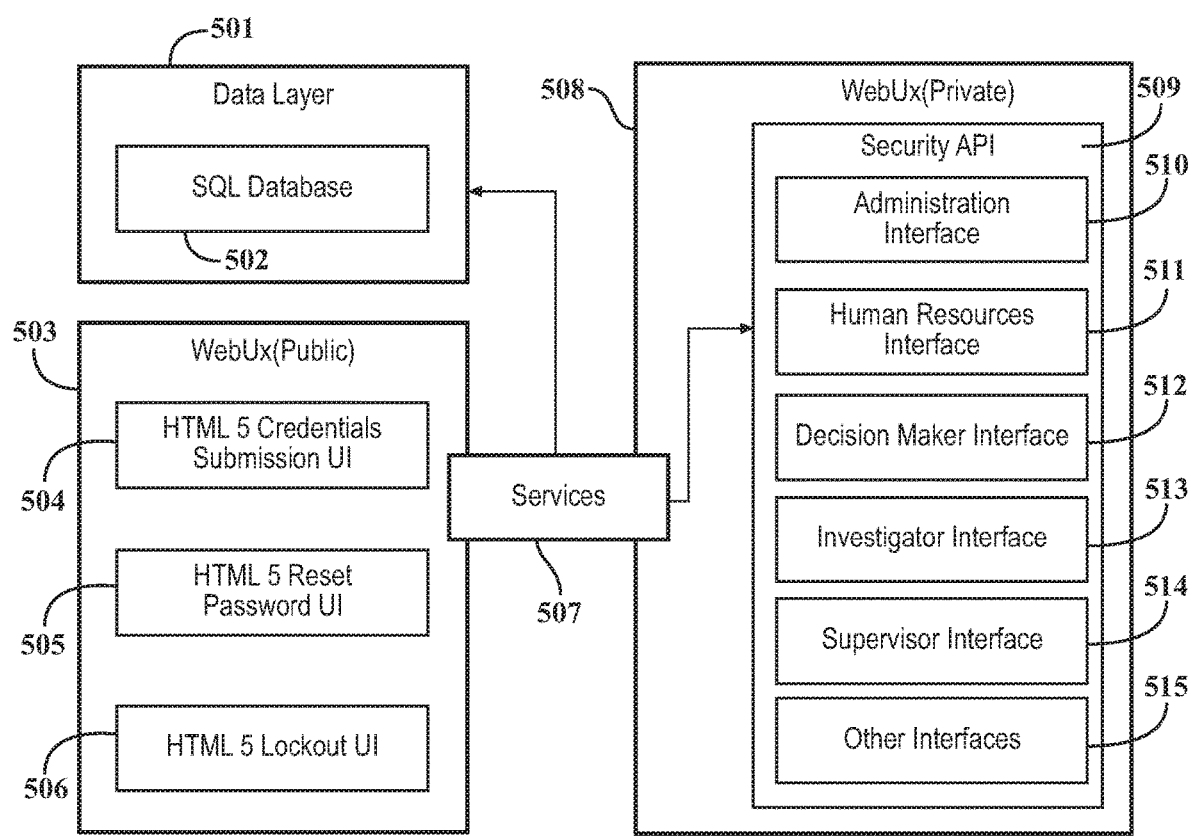
FIG. 5 schematically depicts a block diagram of an illustrative data component architecture for monitoring one or more individuals on a network, determining risk, and providing tools for mitigating risk according to one or more embodiments shown and described herein.

The external source database server 170 in (or interfaced with) the external data source layer 440 may include one or more private sector servers 442 and/or one or more governmental servers 444. Illustrative private sector servers 442 include, but are not limited to, an Appriss® server 170a or the like that contains government associated data, risk mitigation data, compliance model data, crash data, health information data, and/or the like; a credit reporting agency server 170b, such as an Equifax® server, a TransUnion® server, an Experian® server, a Callcredit server, a Creditor-Watch server, a Veda Advantage server, a Creditinfo server, a governmental credit server, and/or the like; a predictive analytics database server 170c, such as that offered by L2C, Inc. (Atlanta, Ga.); an NLETS server 170d and/or another justice or public safety network server; and an intergovernmental organization (IGO) server 170e (e.g., servers offered by the United Nations (UN), the North Atlantic Treaty Organization (NATO), the World Trade Organization (WTO), the World Bank, the International Monetary Fund (IMF), the Islamic Development Bank, the International Criminal Court (ICC), and Interpol). Illustrative governmental servers 444 may include, but are not limited to, a regulatory server 170f (e.g., a server maintained or owned by a governmental regulatory agency), a legislative server 170g (e.g., a server maintained or owned by a legislative body, such as a congressional server), and a statute server 170h, such as a server that catalogs all of the various local, state/province, regional, and national statutes. [0074] FIG. 5 depicts a block diagram of an illustrative data component architecture that may be provided in the client presentation layer 410 (FIG. 4). The various services 507 that may be provided to a user via a public user interface 503 and/or a private user interface 508 may be determined based on information contained in a data layer 501 having an SQL database 502 or the like. The public user interface 503 may generally include various sub-interfaces for authenticating and logging in a user who wishes to use the private user interface 508. As such, the public user interface 503 may authenticate the user as being part of a particular class of users, allow a user to change his/her password, and/or lock a user out if the user cannot be appropriately authenticated (e.g., if the user enters an incorrect password a preset number of times). The sub interfaces of the public user interface 503 may include, for example, a credentials submission user interface 504, a password reset interface 505, and a user lockout interface 506.

Once a user has been appropriately authenticated, the user may be provided with access to the private user interface 508, which may include access to a security application programming interface (API) 509 that provides a particular interface based on the class the user is a part of. Illustrative examples of such particular interfaces include, but are not limited to, an administrative interface 510 (which may be accessed by users in an administrative class), a human resources interface 511 (which may be accessed by users in a human resources class), a decision maker interface 512 (which may be accessed by users in a decision maker class), an investigator interface 513 (which may be accessed by users in an investigator class), a supervisor interface 514 (which may be accessed by users in a supervisor class), and one or more other interfaces 515 (which may be accessed by all registered users and/or users in particular classes). It should be understood that, in some embodiments, a user may be in more than one class, thereby allowing the user to access more than one of the user interfaces provided by the security API 509.

Figure 6:
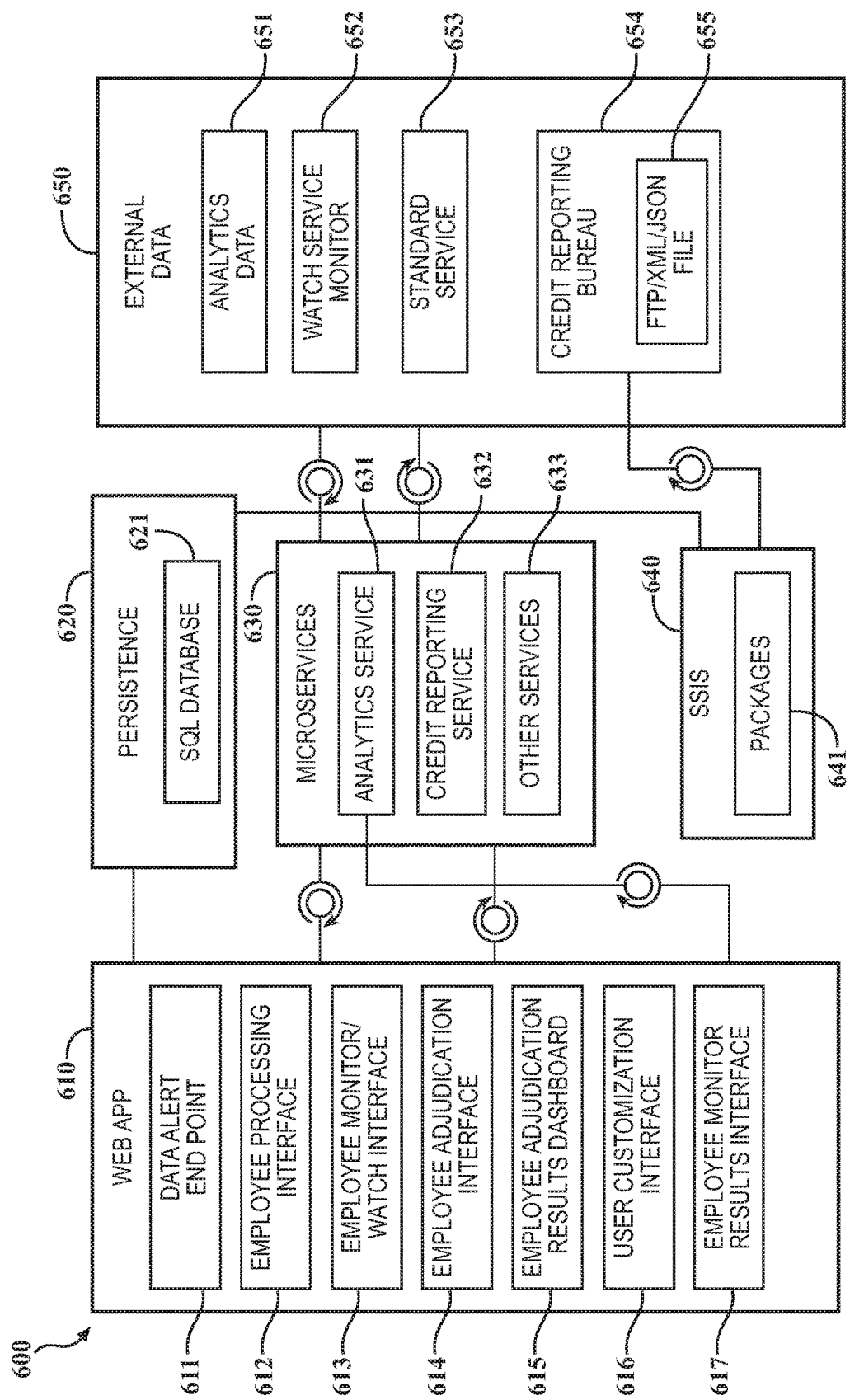
FIG. 6 schematically depicts a block diagram of an illustrative application architecture for monitoring one or more individuals on a network, determining risk, and providing tools for mitigating risk according to one or more embodiments shown and described herein.

Once a user is granted access to the application via a particular interface, an application architecture 600, as depicted in FIG. 6 may define the various components and their interactions in the context of the entire system. That is, the application architecture 600 is the software that bridges the architectural gap between the application server 150 (FIG. 1) and the application's business logic, thereby eliminating the complexities and excessive costs of constructing, deploying, and managing applications. The applications may be organized along business-level boundaries/layers via configuration (instead of programming). Illustrative boundaries may include, for example, a web application layer 610, a persistence layer 620, a microservices layer 630, an SQL Server Integration Service (SSIS) layer 640, and an external data layer 650.

The web application layer 610 may provide access to the systems described herein via a standard internet browser. As such, HTML pages are delivered to a client browser by the application upon request by a user. The web pages may also include JavaScript functions where applicable. If JavaScript is turned off, server-side validations may be performed to ensure all validations are met. Accordingly, the web application layer 610 may include, for example, a data alert end point 611, an employee processing interface 612, an employee monitoring/watch interface 613, an employee adjudication interface 614, an employee adjudication results dashboard 615, a user customization interface 616, and an employee monitor results interface 617.

The persistence layer 620, which may also be referred to as the data access layer, may include the underlying resources that the application uses to deliver its functionality. This includes using a database, such as, for example, an SQL database 621 (including the SQL databases described in greater detail herein) to persist information. Data access objects using certain framework (e.g., Microsoft® model-view controller (MVC) .NET entity framework) may manage the interface to the database. The framework pattern may allow for the abstraction of the persistence from the business component and manages the connection to the data source to obtain and store data. As such, the framework encapsulates all access to a data store.

The microservices layer 630 may be a business objects/logics layer that implements the business rules for the application. The microservices layer 630 may host business service components, as well as business objects (BO). These business services include, for example, an analytics service 631 (e.g., an Appriss® service), a credit reporting service 632 (e.g., a TransUnion® service), and/or one or more other services 633. Such services include dependent dynamic link libraries (DLLs) APIs to the business rules and operations required by the application. Business components are software units that process business logic.

The SSIS layer 640 may implement one or more extract, transform, and load (ETL) processes to import and/or export data from the external data source to a local database. As such, the SSIS layer 640 may include, for example, one or more SQL packages 641 for implementation, as such packages may be used within the scope of the present disclosure.

The external data layer 650 may generally be responsible for all of the data that is externally sourced (e.g., outside the application) but pulled into the application when needed (e.g., when data relating to a particular employee is needed for analysis). As such, the external data layer 650 may include, for example, analytics data 651, a watch service monitor 652, a standard service 653 (as such services are provided within the scope of the present disclosure), and/or a credit reporting bureau source 654, which may provide certain FTP/XML/JSON files 655 relating to credit reports.

Figure 7:
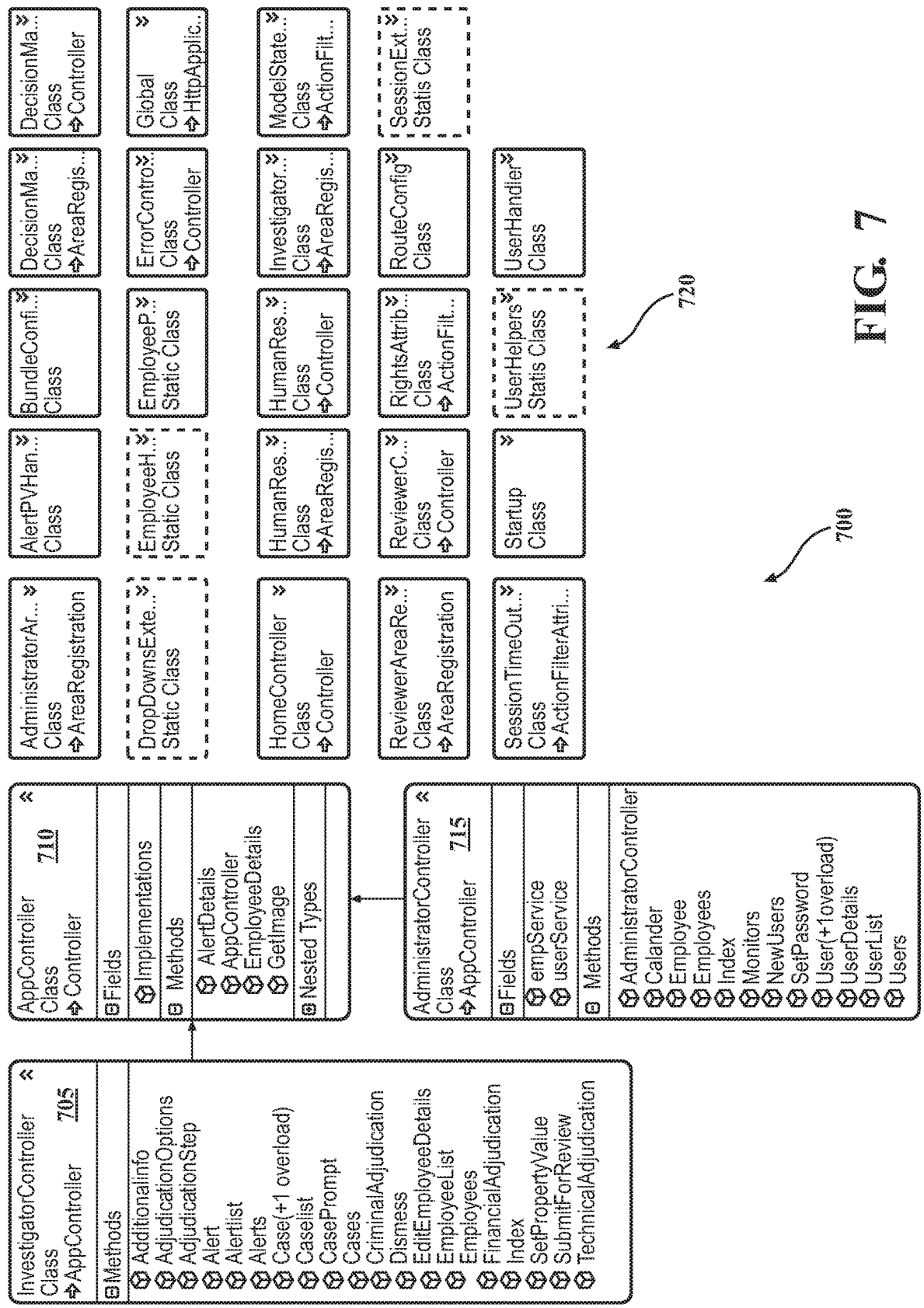
FIG. 7 schematically depicts an illustrative class diagram for an application that monitors one or more individuals on a network, determines risk, and provides tools for mitigating risk according to one or more embodiments shown and described herein.

The various objects in the system described herein may be arranged in an object model, such as the object model 700 depicted in FIG. 7. The object model 700 is generally a description of a structure of the objects in the system described herein, including their identities, relationships to other objects, attributes, and/or operations. The object model 700 may include one or more classes, such as, for example, an investigator controller class 705, an app controller class 710, a user controller class 715, and/or one or more other classes 720. In addition, the object model 700 may further include one or more events, functions, interfaces, methods, namespaces, objects, and properties.

Figure 8:
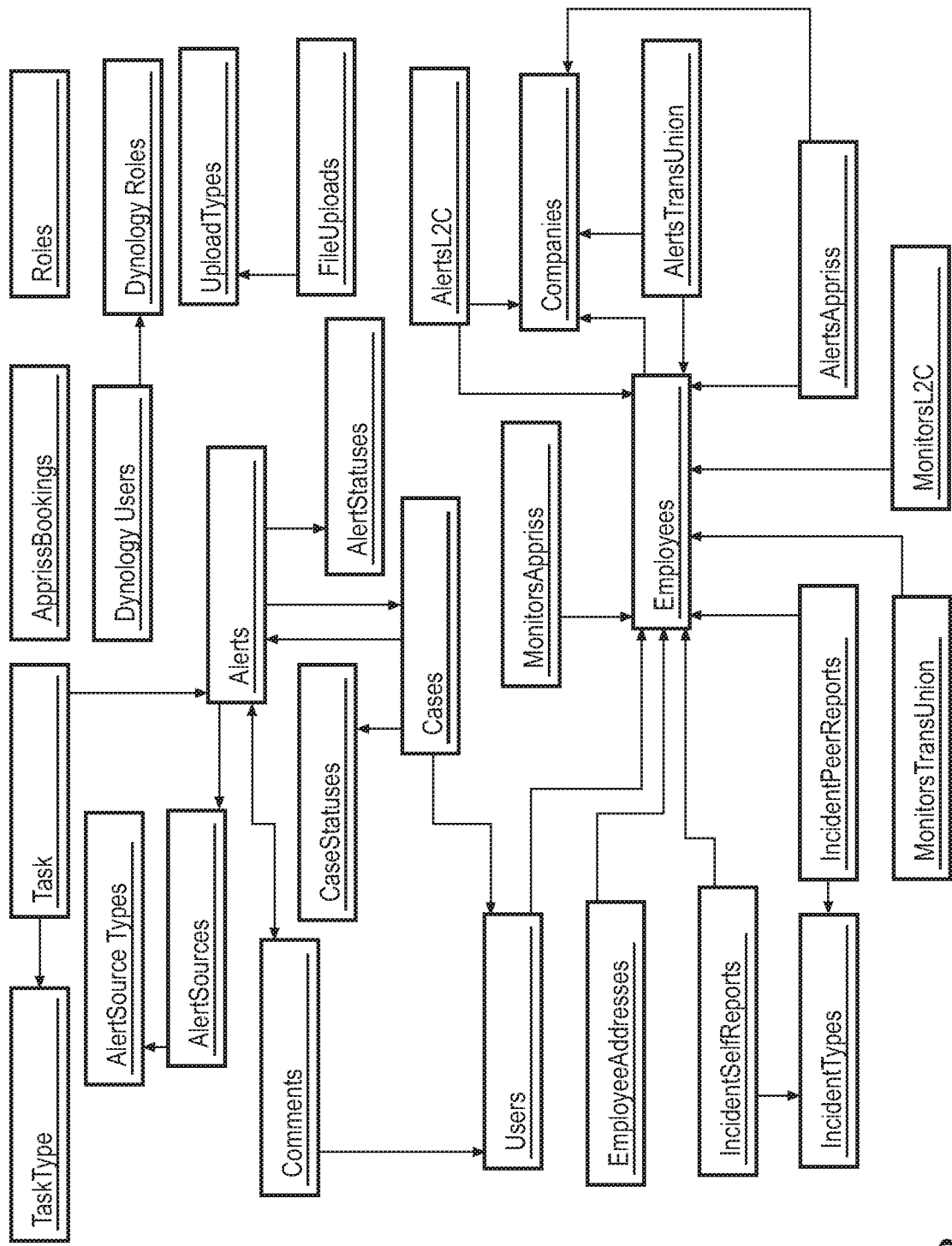
FIG. 8 schematically depicts a block diagram of an illustrative database schema for an application that monitors one or more individuals on a network, determines risk, and provides tools for mitigating risk according to one or more embodiments shown and described herein.

A local database, such as, for example, a database contained within the client database server 180 and/or the core database server 190 (FIG. 1) may be particularly structured for the purposes of appropriate and efficient data access. The database may be, for example, a Microsoft® SQL server database where information and data that are to be stored locally will be determined based on the external data sources (e.g., from one or more of the external source database servers 170 (FIG. 1)). An illustrative data model structure of the local database is depicted in FIG. 8. As generally shown in FIG. 8, the data model provides a method for describing the data structures and includes a set of operations for manipulating and validating the data.

Figure 9A:
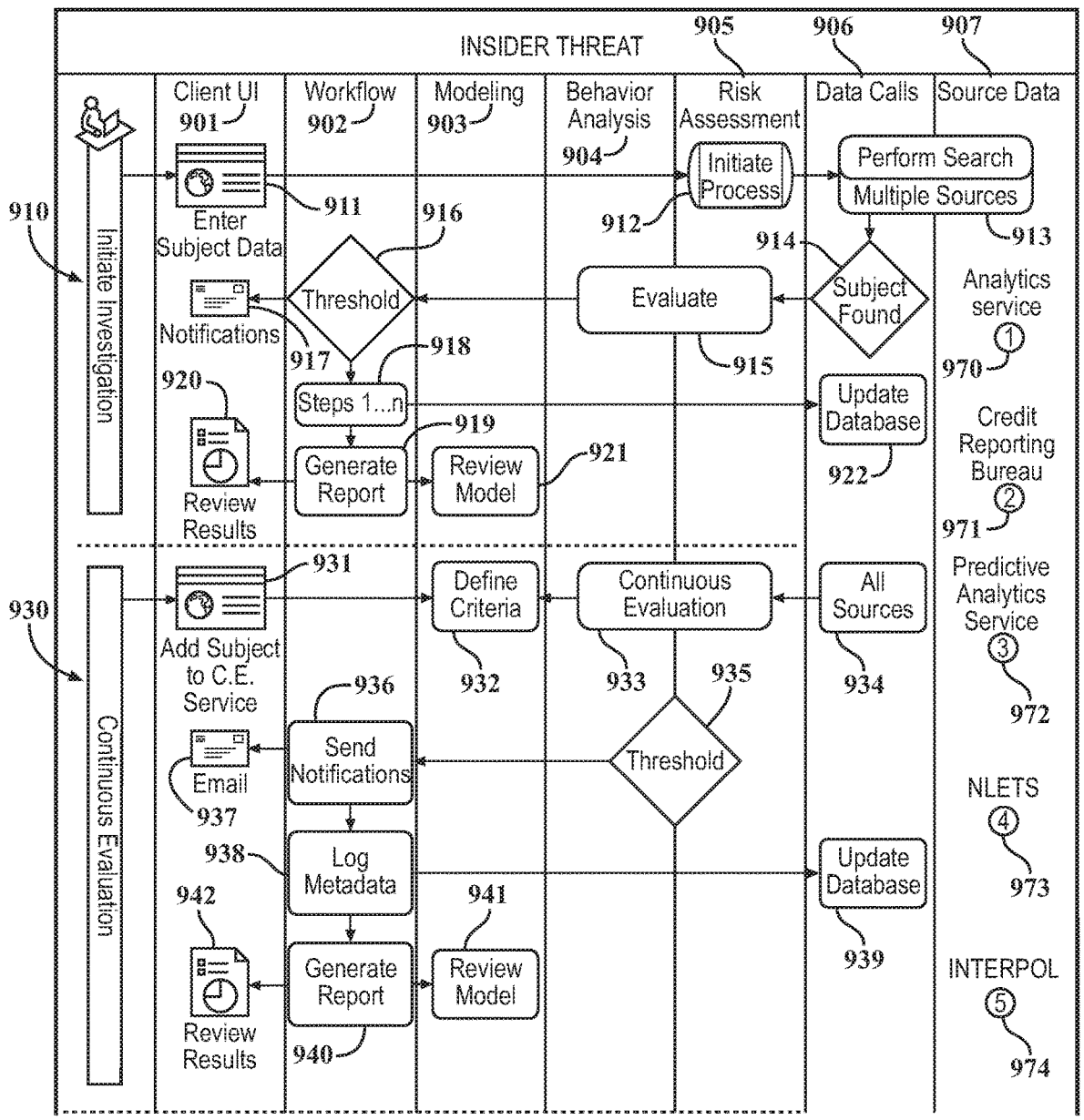
FIG. 9A schematically depicts a first portion of a sequence diagram of various illustrative interactions between modules in an application that monitors one or more individuals on a network, determines risk, and provides tools for mitigating risk according to one or more embodiments shown and described herein.
Figure 9B:
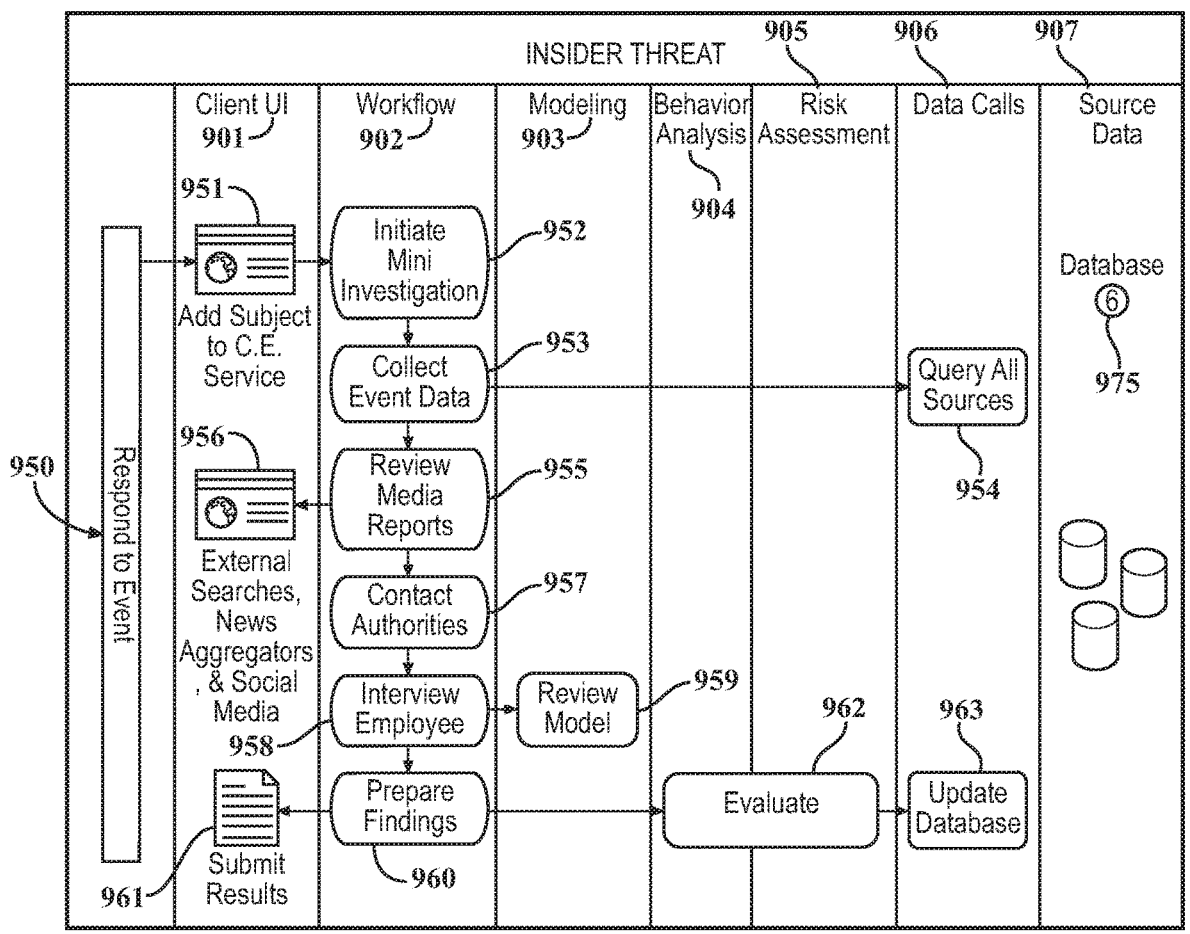
FIG. 9B schematically depicts a second portion of a sequence diagram of various illustrative interactions between modules in an application that monitors one or more individuals on a network, determines risk, and provides tools for mitigating risk according to one or more embodiments shown and described herein.

Referring now to FIGS. 9A-9B, a general overview of the sequence of events in an application provided by the systems and methods described herein is shown. The general overview depicts the one or more layers that may be active in completing a particular process, including a client user interface layer 901, a workflow layer 902, a modeling layer 903, a behavior analysis layer 904, a risk assessment layer 905, a data calls layer 906, and a source data layer 907. The source data layer 907 may provide access to one or more external sources, such as an analytics service 970, a credit reporting bureau 971, a predictive analytics service 972, an NLETS service 973, an intergovernmental organization service 974 (e.g., Interpol), and a local database 975, as such services (and the databases/servers associated therewith) are described herein.

One general process may be to initiate an investigation at step 910. This may generally include entering subject data relating to an employee to be investigated in the client user interface layer 901 at step 911. The process may be initiated in the risk assessment layer 905 at step 912, and a search for information/data relating to the selected employee may be completed in the data calls layer 906 and/or the source data layer 907 at step 913.

At step 914, a determination may be made as to whether data regarding the subject is found, and if so, an evaluation process may be completed in the behavior analysis layer 904 and the risk assessment layer 905. The analysis at 915 is described in greater detail herein with respect to FIGS. 10A and 10B.

At step 916, a determination may be made in the workflow layer 902 as to whether a certain threshold has been reached. That is, the determination may be made as to whether one or more anomalies associated with the employee have been detected. If not, a notification may be provided at step 917 in the client user interface layer 901. Otherwise, one or more potential steps for minimizing the risk may be determined at step 918 and a report may be generated at step 919 in the workflow layer 902. The results of the report may be provided to a user in the client user interface layer 901 at step 920 and/or a model may be generated and/or reviewed in the modeling layer 903 at step 921.

Another general process may include continuously evaluating a particular employee at step 930. This may generally include adding the employee to be monitored to a continuous evaluation service in the client user interface layer 901 at step 931, defining certain criteria to monitor in the modeling layer 903 at step 932, and conducting a continuous evaluation in the behavior analysis layer 904 and the risk assessment layer 905 at step 933. Such a continuous evaluation according to step 933 may include receiving data from one or more sources in the data calls layer 906 at step 934. A determination is made at step 935 as to whether a threshold has been reached, and if so, notifications may be sent to one or more users at step 936 (via an email in the client user interface layer 901 at step 937), metadata may be logged at step 938, and a report may be generated at step 940, all in the workflow layer 902. As a result of the generated report, the results may be provided to a user at step 942 in the client user interface layer 901 and/or the model may be generated/reviewed in the modeling layer 903 at step 941.

Yet another general process may be to respond to a detected event (e.g., an event resulting from a monitored employee's activity) at step 950. This may generally include adding the monitored employee to a continuous evaluation service in the client user interface layer 901 at step 951 (if the employee has not already been added) and initiating a mini investigation of the employee in the workflow layer 902 at step 952.

At step 953, event data may be collected in the workflow layer 902, which may include querying sources at the data calls layer 906 at step 954. If any media reports are generated, they may be accessed at step 956 in the client user interface layer 901 and reviewed in the workflow layer 902 at step 955. If necessary, at step 957, authorities may be contacted and the employee may be interviewed (or a report of interview results may be provided) at step 958 in the workflow layer 902. The generated model may be reviewed at step 959 in the modeling layer 903 and findings may be prepared at step 960 in the workflow layer 902. The results may be provided to one or more users in the client user interface layer 901 at step 961 and/or the results may be evaluated in the behavior analysis layer 904 and risk assessment layer 905 at step 962. In addition, the database may be updated with the results at step 963 in the data calls layer 906.

Figure 10A:
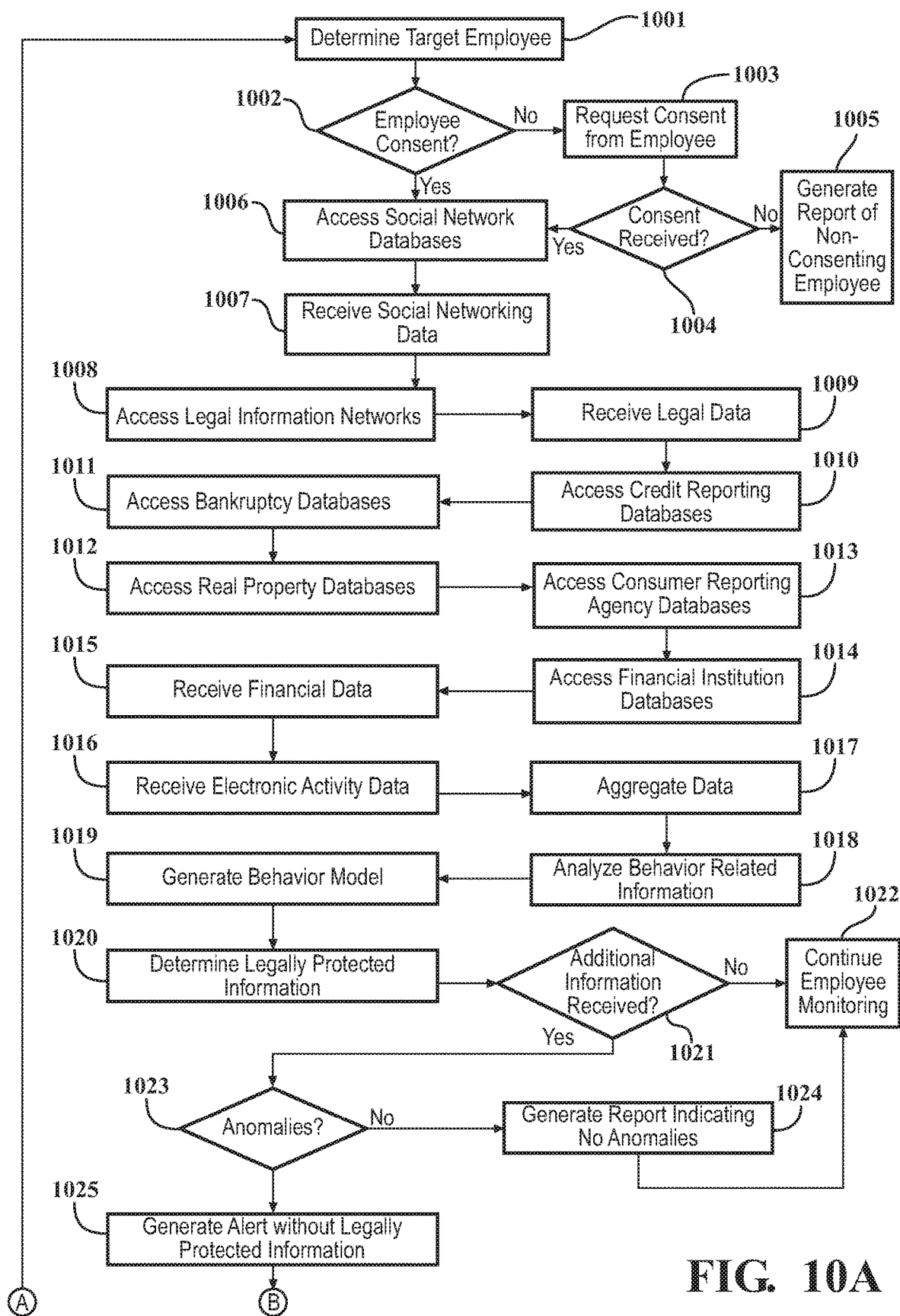
FIG. 10A depicts a flow diagram of an illustrative method of evaluating a behavior of an employee according to one or more embodiments shown and described herein.
Figure 10B:
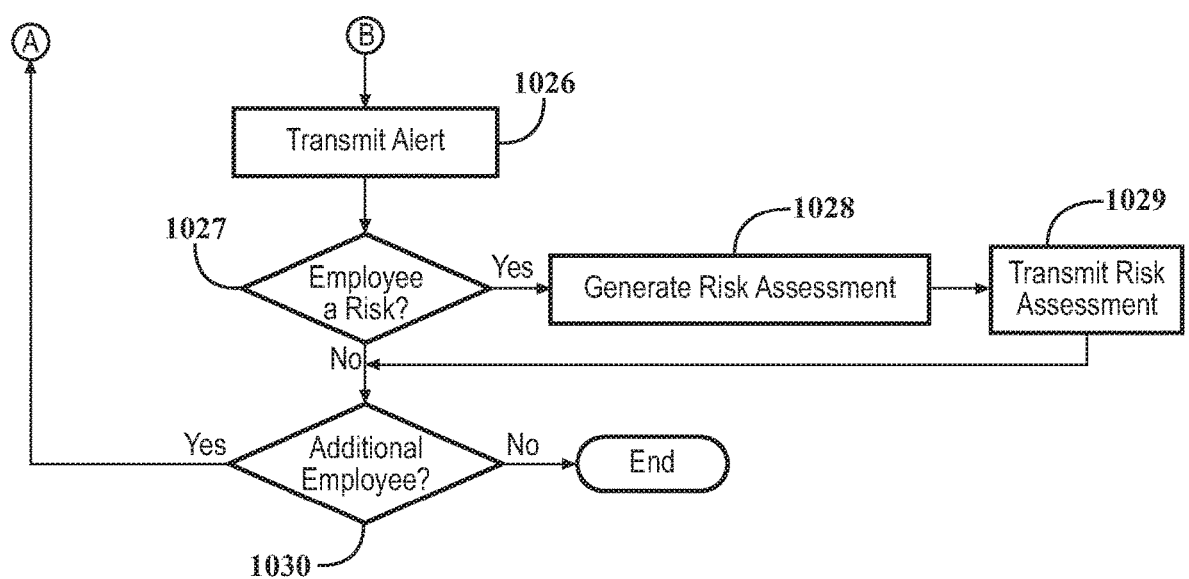
FIG. 10B is a continuation of the flow diagram of FIG. 10A.

FIGS. 10A and 10B provide a more detailed flow diagram of the various processes that may be completed to evaluate the behavior of a target employee to identify risk, which includes both online and offline behavior. The method described with respect to FIGS. 10A and 10B may generally be completed by the systems described herein, including the computing network 100 described with respect to FIG. 1 and/or the various components thereof. FIGS. 10A and 10B relate to steps for evaluating the behavior of a single target employee at a time. However, it should be understood that the steps described herein with respect to FIGS. 10A and 10B may be completed for a plurality of target employees at substantially the same time. As such, while the singular term "target employee" is used herein, it is meant to encompass a plurality of target employees as well. In addition, the term "target employee" merely characterizes a particular employee for which data is obtained. As such, the term "target employee" may be used interchangeably with "employee," "particular employee," "a number of employees," and/or the like.

At step 1001, a target employee to be potentially monitored and/or investigated may be determined. Such a determination may generally include identifying a target employee, which may be an employee subject to continuous evaluation, an employee suspected of activity that is potentially adverse to the organization, an employee randomly selected from a particular population of employees, and/or one of each of the plurality of employees associated with an organization (e.g., in instances where all employees of an organization are monitored by the systems and methods described herein).

To ensure that the systems and methods described herein comply with one or more laws, such as privacy laws or the like, a determination may be made at step 1002 as to whether the target employee has consented to monitoring activities, including consent to accessing and/or receiving any of the data, particularly private data, from external sources, as described herein. In a non-limiting example, consent may be company policy-based. In another non-limiting example, in embodiments where a target employee is an employee, a contractor, or the like of the organization, the target employee may have provided consent as a condition of employment. In yet another non-limiting example, in embodiments where the target employee is an authorized employee of a computing device owned and/or maintained by the organization, the target employee may have provided consent as a condition for using the computing device.

If a target employee's consent has not been obtained, consent may be requested at step 1003. For example, consent may be requested by transmitting a request (e.g., sending an email) to the target employee and requesting that the target employee click a link, sign a document, or the like to indicate his/her consent to monitoring. Accordingly, at step 1004, another determination is made as to whether the target employee's consent has been received in response to the request. If consent is not received, the system may optionally generate a report indicating that the target employee is a non-consenting employee at step 1005. In addition, the system may not proceed to monitor the target employee as described herein or alternatively may only monitor publicly available information about the employee (i.e., private information is not monitored). As a result, in some embodiments, the target employee may be blocked from accessing certain resources, such as accessing computing devices owned and/or maintained by the organization, accessing the Internet, accessing a local intranet, and/or the like. In other embodiments, an incentive that may be provided to the target employee upon receiving the target employee's consent may be withheld (e.g., a monetary payment or the like may be withheld).

If consent has been received at step 1002 or 1004, both public data and private data may be monitored. Monitoring may include, for example, conducting a scrape of the Internet for information regarding the target employee or may receive information specific to the target employee (or aggregate information containing information regarding the target employee) from one or more third party devices. The scrape generally refers to an executable software program that queries the Internet for information relating to the target employee. Monitoring may also include providing information to a data source regarding the employee such that the data source automatically pushes employee-related information whenever it is generated and/or available. Monitoring may also include receiving providing information to a data source regarding the employee at a particular interval (e.g., hourly, daily, or the like) and immediately receive updated information regarding the employee (if any information at all).

Some monitoring may include accessing social network databases at step 1006 and receiving social networking data at step 1007. For example, if the employee has consented to monitoring as described hereinabove, the social network databases may be monitored and data may be received regardless of whether the employee has marked the information as private. Similarly, if the employee has not consented to monitoring as described hereinabove, the social network databases may be monitored and data may be received for public data only. In some embodiments, private social networking data may never be monitored or received, regardless of whether the employee has provided consent, which may be dependent upon the laws, regulations, or the like that are in effect in various state and local jurisdictions at the time.

In various embodiments, the social networking data may be received as a periodic data transfer from a social networking source and/or by monitoring a social networking feed, such as from the social network itself (e.g., Facebook®, Twitter®, Instagram®, Tumblr®, Snapchat®, and/or the like), from a social network feed aggregator, from a social network data provider, and/or the like. In some embodiments, the social networking data may be data that corresponds to the target employee, such as data from an employee account registered with the social networking site that is associated with the target employee. Data that corresponds to the target employee generally includes all of the target employee's activity on a social networking site, including posts made by the employee, posts made by others that reference the employee, data that is uploaded by the target employee (e.g., photos, videos, and/or the like), photos and videos where the target employee is tagged, items that the target employee has "liked", comments made by the target employee on other employees' posts, uploads, comments, and/or the like, websites that the target employee has accessed while logged into the social network, links that the target employee has clicked, and/or the like. In some embodiments, accessing and receiving the data may include accessing aggregated data from a social networking source and searching the aggregated data to obtain data that is specific to the target employee. In other embodiments, accessing and receiving the data may include receiving one or more data files that is specific to the target employee.

In some embodiments, in addition to receiving social networking data, the system may access legal information networks at step 1008 and receive legal data at step 1009. A legal information network is not limited by this disclosure and may be any source that provides access to legal (e.g., law enforcement and judicial) information or legal-related information, including the various sources previously described herein. For example, a legal information network may include an Appriss® source, international justice and public safety network (NLETS) source, a justice source, a public safety network source, an intergovernmental organization source (e.g., INTERPOL), a governmental source, and/or the like. In some embodiments, a legal information network may include one or more legal databases that include data regarding legal activity relating to the target employee. Illustrative legal databases include a law enforcement agency database, a judicial database, a regulated public records database, and a regulated public information database. Illustrative law enforcement agency databases include databases owned and/or maintained by a local law enforcement agency (e.g., local police, county sheriff, transit police, and/or the like), a state/provincial law enforcement agency (e.g., state police), a national law enforcement agency (e.g., FBI, ATF, DEA, homeland security), an international cooperative of law enforcement (e.g., INTERPOL), a private security force, and/or the like. Illustrative judicial databases include databases that are owned and/or maintained by courts (e.g., local courts, state courts, district courts, circuit courts, and supreme courts), regulatory agency judicial authorities, and/or the like. Illustrative regulated public records and regulated public information databases include databases that are provided by public and private entities (e.g., law enforcement cooperatives, state government cooperatives, and/or the like), such as NLETS, sex offender databases, securities databases, and/or the like. In some embodiments, data from these legal databases may be received as a live feed, a periodic data transmission, data that is made available for access and/or download, and/or the like.

In some embodiments, portions of the legal data may be subject to privacy laws, regulations, and/or the like. For example, certain legal data that has been ordered sealed by a court of law (such as a juvenile criminal record or an expunged criminal record) may not be circulated and/or disclosed without legal ramifications. As such, these portions of legal data may be designated legally Protected Information that may be used for the purposes of determining anomalies (as described in greater detail herein), but cannot be disclosed to any individual or entity.

In embodiments where the employee has not consented as described hereinabove, certain portions of the legal data may not be received at step 1009, such as legal data that is private, legal data that is subject to privacy laws, regulations, or the like, or any other non-public legal data. In some embodiments, only portions of the legal data that are published by particular sources may be obtained for a non-consenting employee (e.g., legal data that is published in newspapers). In other embodiments, none of the legal data may be received at step 1009 if the employee has not consented as described hereinabove.

In addition to social networking data and legal data, financial data regarding the target employee may also be obtained. As such, credit reporting databases may be accessed at step 1010, bankruptcy databases may be accessed at step 1011, real property databases may be accessed at step 1012, consumer reporting agency databases may be accessed at step 1013, and/or financial institution databases may be accessed at step 1014. Illustrative credit reporting databases may include, but are not limited to, databases on the various credit reporting agency servers 170*b* (FIG. 4) described herein. Illustrative bankruptcy databases may include, but are not limited to bankruptcy court databases (e.g., district bankruptcy court databases), private bankruptcy data provider databases (e.g., a database provided by an Appriss® server), and/or the like. Illustrative real property databases include public databases containing evidence of real property transactions, real estate tax assessor databases, real estate broker transaction databases, commercial real estate databases, databases that are owned and maintained by consumer oriented companies such as Zillow® and Trulia®, community classified databases that relate to real estate transactions, newspaper real estate transaction databases, and/or the like. Illustrative consumer reporting agency databases may include, but are not limited to, databases owned and/or maintained by specialty consumer reporting agencies, such as medical reporting agencies, employment history reporting agencies, check screening/check history reporting agencies, payday lending reporting agencies, supplementary/alternative credit reporting agencies, utility reporting agencies, rental reporting agencies, and/or the like. Illustrative financial institution databases may include, but are not limited to, databases that are owned and/or maintained by banks, credit unions, financial organizations, security trading organizations, brokers, and/or the like. As a result of accessing any one of the databases described herein, financial data (including financial activity data) may be received at step 1015. In some embodiments, data from these financial databases may be received as a live feed, a periodic data transmission, data that is made available for access and/or download, and/or the like.

The financial data is not limited by this disclosure, and generally includes any data that has financial ties, including, but not limited to, financial assets (including liquid assets, real property assets, personal property assets, intellectual property assets, securities assets, and/or the like), debts, credit card transaction records, bank account transaction records, credit scores, bankruptcy proceedings, legal proceedings that may include an exchange of financial assets, tax records, and/or the like.

In some embodiments, portions of the financial data may be subject to privacy laws, regulations, and/or the like. For example, certain financial data such as credit reports, account balances, tax records, private transactions, or the like may not be circulated and/or disclosed without legal ramifications. As such, these portions of financial data may be designated legally Protected Information that may be used for the purposes of determining anomalies (as described in greater detail herein), but cannot be disclosed to any individual or entity.

In embodiments where the employee has not consented as described hereinabove, certain portions of the financial data may not be received at step 1015, such as financial data that is private, financial data that is subject to the FCRA and various other privacy laws, regulations, or the like, or any other non-public financial data. In some embodiments, only portions of the financial data that are published by particular sources may be obtained for a non-consenting employee (e.g., financial data that is published in newspapers). In other embodiments, none of the financial data may be received at step 1015 if the employee has not consented as described hereinabove.

At step 1016, electronic activity data may be received. The electronic activity data may generally be data that relates to the target employee's activities while using a computing device and/or other network resource on the organization's network, including any access to external sources (e.g., the Internet) via the organization's computing device and/or network. As previously described herein, such activity may include, but is not limited to, keystrokes, clicks, electronic mail transmissions, websites visited, files that are downloaded locally onto a device, and/or the like.

At step 1017, all of the data received via one or more of the steps described herein may be aggregated for the target employee such that the data can be accessed in a single location for the purposes of determining anomalies, analyzing risk, generating risk assessments, generating reports, weighting data, generating instructions for responding to an alert, generating a behavior model, and/or the like. The data may be aggregated into, for example, an employee profile for the target employee. As such, the employee profile includes all obtained information regarding the employee as described herein.

The aggregated data may be analyzed, particularly for behavior related information, at step 1018 and a behavior model may be generated at step 1019. The behavior model may generally include information from at least one of the social networking data, the legal activity data, the financial activity data, and the electronic activity data described hereinabove, including information that may appear to be germane to such a behavioral assessment. In some embodiments, the behavior model is generated by a behavior profile segment.

The behavior model may be determined by processing information such as a property owned by the employee, information regarding utilities used by the employee, information regarding travel completed by the employee, information regarding a club membership held by the employee, information regarding a group membership held by the employee, information regarding a subscription held by the employee, information regarding a previous employment of the employee, information regarding a publication made by the employee, information regarding a license held by the employee, and/or information regarding a registration held by the employee, each of which may be obtained from one or more of the data sources described herein. Accordingly, the behavior model of the target employee is determined by both internal information inputted by a user as well as information supplied by the feeds.

In some embodiments, the behavior model may be used for the purposes of having a record of what is considered "typical" behavior for the target employee (e.g., a baseline representation of the target employee's behavior for the purposes of determining an anomaly), and is not necessarily an indication that the employee's behavior is indicative of risk or other adverse activity towards the organization. Rather, the behavior model can be used for the purposes of comparison as new data is received from any one of the data sources to determine a *nexus* the new data and the data contained in the behavior model for the purposes of determining whether any anomalies exist, as described in greater detail herein.

At step 1020, the legally Protected Information is determined from the behavior model, employee profile, and/or the aggregated data received from the one or more sources described herein. As previously described herein, the legally Protected Information is generally information from the obtained data that is protected from disclosure by one or more laws, rules, regulations, and/or the like. In addition, the legally Protected Information may be information that cannot directly be used as a basis for any action taken against the target employee (e.g., disciplinary measures or the like). However, the legally Protected Information may be used by the systems and methods described herein for the purposes of determining anomalies and generating a report. To the extent that legally Protected Information exists, it may be indicated in a manner so that it is not disclosed in any of the outputs described herein. In a non-limiting example, the legally Protected Information may be flagged and/or quarantined such that it is recognizable as legally Protected Information and separable from other information contained within the aggregated data, employee profile, and/or the behavior model.

At step 1021, a determination may be made as to whether additional information has been received regarding the target employee since creation of the behavior model. The additional information may be received, for example, by accessing and/or receiving any of the data as described herein with respect to steps 1006-1016. If no additional information has been received, the system may continue monitoring the target employee until additional information is received at step 1022.

If additional information has been received, at step 1023, a determination may be made as to whether any anomalies associated with the target employee are detected. Such a determination is based primarily on the employee profile and/or the behavior model, including the legally Protected Information contained therein. The determination generally includes processing all information received so as to classify and weight the information, and compare the processed and weighted information with information generated in the behavior model. Thus, an anomaly may be detected if newly received information, once classified and/or weighted, does not correspond to an expected value based on the information from the behavior model and/or the employee profile (including the legally Protected Information therein).

Determining the anomaly by weighting the information contained within the data received may include weighting according to one or more factors associated with the target employee, wherein the one or more factors are selected from a job category of the target employee, a responsibilities category of the target employee, a prior history of the target employee, a performance review of the target employee, a ranking of the target employee, a written complaint regarding the target employee, and an award received by the target employee. For example, if a target employee is an employee with access to the organization's funds (e.g., one of the factors is the employee's job category) and the information contained within the data is an arrest for theft, such an arrest would be weighted higher than it would be for another employee with a job category factor that does not include access to the organization's funds (e.g., a mail room clerk or the like).

While certain organizations may have common risk concerns such as theft, assault and the like, the systems and methods described herein are configurable so as to include the unique risk concerns of a particular organization utilizing the systems and methods described herein. For instance, a financial company may have a need to closely monitor the financial situation of each of its employees, contractors, service providers and/or the like, whereas a trucking company may have a need to closely monitor the driving record of its employees, contractors, and/or the like. Accordingly, the systems and methods described herein may be configured to provide a more detailed analysis of financial feeds for the financial company than for the trucking company, whereas the systems and methods described herein may be configured to provide a more detailed analysis of the driving records for the trucking company than the financial company. The systems and methods described herein can also be configured to apply different "weightings" to each set of information, based on the needs of a particular organization.

If no anomalies are determined at step 1023, a report may optionally be generated indicating no anomalies at step 1024. The process may return to step 1022 to continue monitoring the target employee until additional data is received or additional anomalies are observed.

If one or more anomalies are determined at step 1023, an alert may be generated at step 1025 and transmitted at step 1026. The alert may generally be related to the one or more anomalies that have been detected, but may not contain any references to the legally Protected Information. That is, the alert may be contained within a report that is provided to an alerted employee (such as one of the employees described herein) indicating that an anomaly was detected for the target employee, as well as information regarding the anomaly that was determined to the extent that the information does not contain any legally Protected Information.

At step 1027, a determination may be made as to whether the target employee poses a risk to the organization based on the one or more anomalies. For example, the determination may be made that the target employee poses a financial risk to the organization as a result of one or more of an increase in the target employee's spending, a decrease in the target employee's credit score (i.e., a credit score that is not a FICO credit score), an increase in the frequency which the target employee attends a bar (e.g., which may be determined based on an increase in balances past due or charged off, and/or a pending legal action. Further, of the above listed factors, the fact that the target employee increased his/her spending may be assigned a weighted value in light of the other factors such as, for example, the job functions of the target employee, as described hereinabove.

If the target employee does pose a risk to the organization, a risk assessment may be generated at step 1028 and may be transmitted at step 1029. The risk assessment may generally be a report that indicates the determined risk, and may further include information about the risk, how it was determined, how it might potentially affect the organization, and/or how it may be mitigated. As such, generating the risk assessment at step 1028 may further include generating one or more instructions for responding to the alert based on the risk assessment (i.e., one or more steps that may be taken to minimize or eliminate the risk) and/or transmitting the one or more instructions as a part of step 1029 to one or more designated computers and/or employees designated for receiving the report.

Once the risk assessment has been generated and transmitted or if the employee is determined not to be a risk, a determination may be made at step 1030 as to whether additional target employees should be monitored. Such a determination may occur m instances where a single target employee is monitored and analyzed at a time, rather than a plurality of target employees at substantially the same time. If additional employee(s) are to be monitored and/or investigated, the process may return to step 1001. If no other employees are to be monitored, the process may end.

Figure 12:
FIG. 12 depicts an illustrative screen shot of a cases user interface for a decision maker user according to one or more embodiments shown and described herein according to one or more embodiments shown and described herein.

FIGS. 11 and 12 depict an illustrative user interface that may be tailored to a particular user for reviewing any alerts that may be generated by the systems and methods described herein. More specifically, FIG. 11 depicts a user interface for an investigator user. The investigator user interface includes information regarding the target employee, including the target employee's name, title of the alert, and the type of alert. An investigator can review the alert to investigate the employee and determine whether to conduct additional investigation on the target employee, pass the alert off to another user, or the like. For example, the investigator may pass the alert off to a decision maker, who may view the passed alert in the decision maker user interface depicted in FIG. 12 and render a decision as to action that may or may not be taken with respect to the target employee.

Additional user interface activities will be described below with respect to the example. It should be understood that the example provided below is merely illustrative, and alternative user interface activities may be implemented without departing from the scope of the present disclosure.

Example—User Interface

The systems and methods described herein may generate a plurality of web pages as a part of providing a user interface. For example, as shown in FIGS. 13A and 13B, each page includes a side menu having tabs which take the user to different functions. The functions are displayed along a space adjacent the side menu. Each page includes a plurality of icons on the top bar of the page. The top bar further includes the identification of the user. For illustrative purposes, the user is David Barn. The dashboard is specific to Mr. Barn and includes displays for alerts, incidents, and cases. Beneath the display of cases are displays for notifications and tasks. The display of alerts provides a notification of an anomaly/risk based upon online sources or information from one or more live feeds relating to a plurality of personnel/employees. The alerts are generated by the systems and methods described herein, which monitors each target employee. Incidents are generally provided to describe offline information gathered from peer-to-peer reporting, which includes a list of cases which Mr. Barn is administering and below the dashboard are notifications and tasks that are assigned to Mr. Barn. The bottom of the page is a snapshot of cases assigned to Mr. Barn. Specifically, Mr. Barn has 3 alerts and is administering 17 open cases, 10 of which are criminal, 3 relate to financial matters, 2 are technical, and 8 are being monitored.

Figure 14:
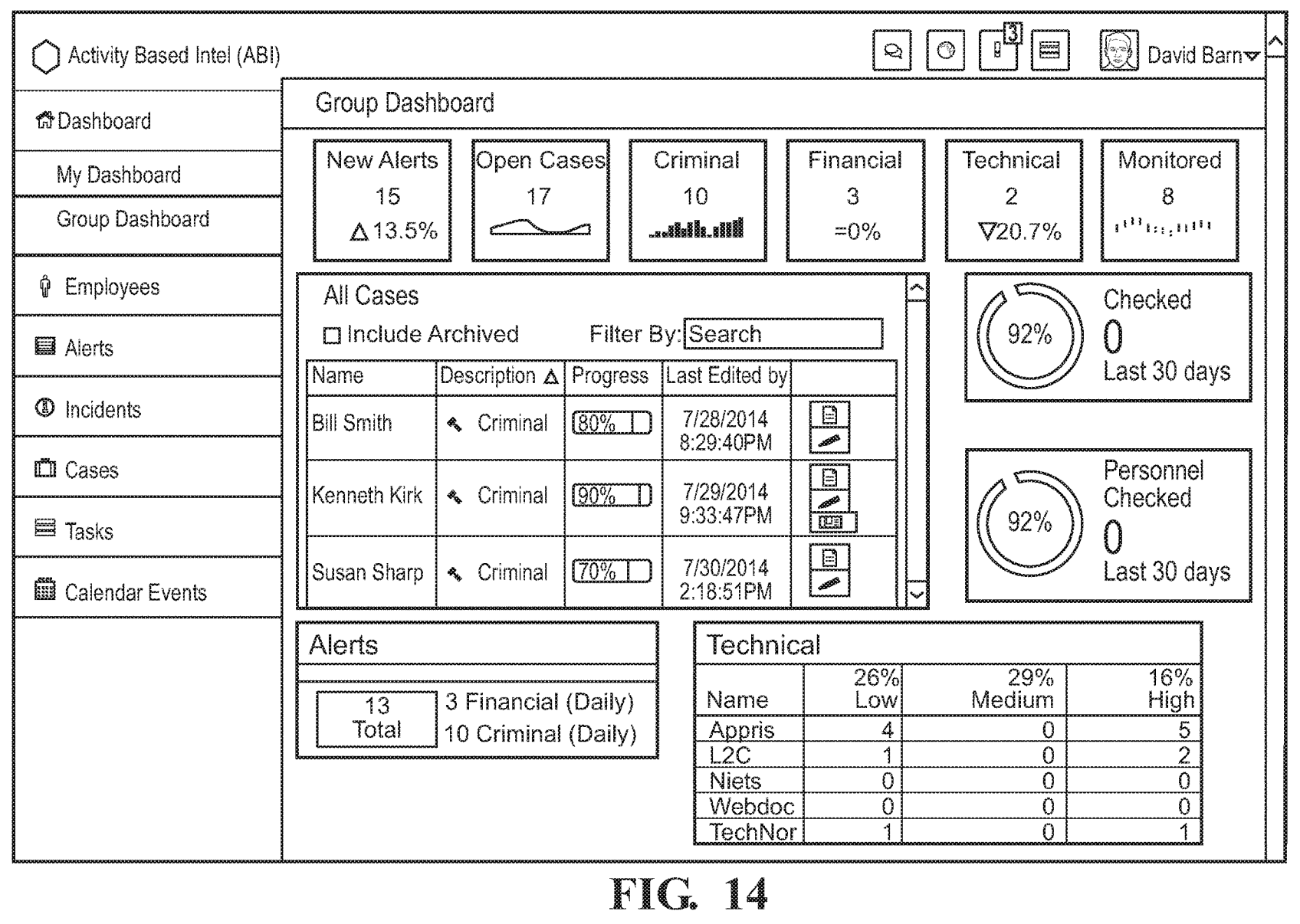

With reference now to FIG. 14, a group dashboard is provided. The group dashboard shows the status of all of the computers (not shown) monitored by the system. For illustrative purposes, 15 new alerts have been generated by the online risk assessment segment are currently open, and the types of cases are also provided. The type of cases may be identified based upon the live feed for which information generating an alert is taken. For instance, Bill Smith has a "criminal" case.

It should be appreciated that the systems and methods described herein may also generate an alert by processing information from the live feeds, an online risk assessment segment, and the behavior model, as described in greater detail herein. Thus, the systems and methods described herein compare activities of the target employee with behavior of the target employee to determine if the activity poses a risk to the company. For instance, an employee who has a job function requiring the use of a company car may be given an alert for an arrest for reckless driving or driving under the influence of drugs or alcohol, whereas an employee with a job function which does not require the use of a company car may not be given a task or action for the same infraction. It should be further appreciated that the alert may be generated based upon a single piece of information from the feeds, a single feed, or may be may be based upon multiple bits of information taken from different feeds. In such a case, the information may be either given a weighted value sufficient to generate a task, or may be one of a plurality of offenses, or actions in a list.

The alert may also be generated upon an aggregation of information taken over a predetermined period of time and may be based upon information from different sources. For instance, an alert may be generated based upon information from financial feeds as well as social media sites indicating which taken as a whole would indicate that the Employee is going through a difficult time both financially and emotionally. Such information may be useful in identifying proper counseling and assistance to the employee. It should also be appreciated that the systems and methods described herein may be configured to continuously update the behavior model and may generate an alert as information is received from the feeds and determined to contain an anomaly.

Alternatively, the systems and methods described herein may provide a drop down menu of types of cases which a user may choose from in the event the classification is incorrect. The systems and methods described herein may identify the alert as criminal based upon information taken from the legal (e.g., law enforcement and judicial) feed. The middle portion of the display has a scroll-down menu which allows the user to scroll down through each of the cases and provides a link to the specific case. Accordingly, it should be appreciated that the systems and methods described herein may be administered by a plurality of personnel having a predetermined level of access. The personnel may be assigned to one of a plurality of a number of cases opened up by the system.

Figure 15:
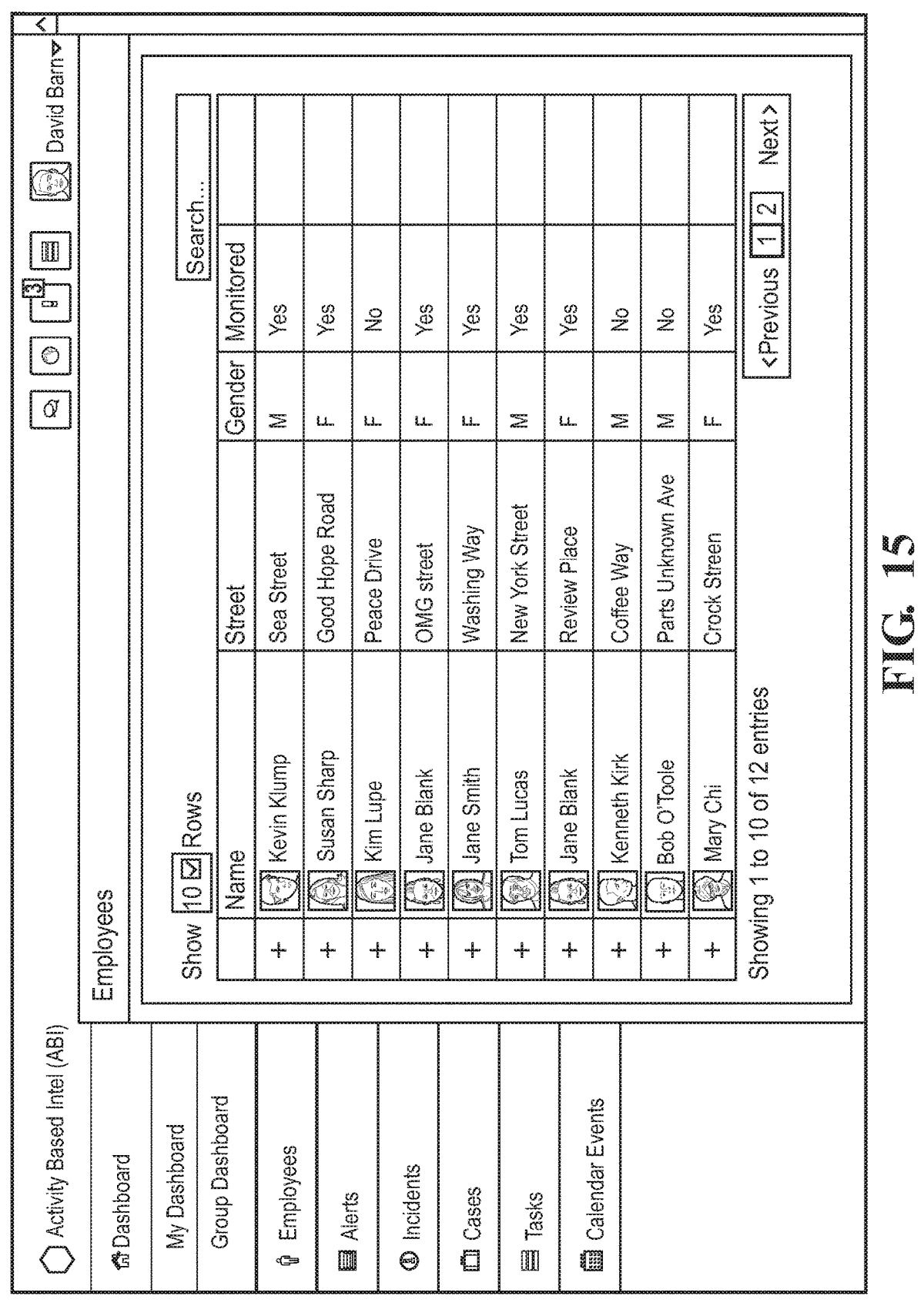

With reference now to FIG. 15, the employee tab of the side menu is actuated. The systems and methods described herein provide a display of all of the employees of the company. As shown, the status of each employee with respect to the system is provided. Specifically, FIG. 15 shows that Mr. Klump, Ms. Sharp, Ms. Lupe, Ms. Blank, Ms. Smith, Mr. Lucas, and Ms. Chi are being investigated, whereas Ms. Kirk and Mr. O'Toole are not being investigated. As used herein, "investigated" means that an alert has been generated as described herein and a deeper query is executed for an employee of interest wherein the systems and methods described herein execute a query to intensify the scrutiny of the employee of interest. Accordingly, a deeper search of anyone or all of the plurality of feeds or a heightened search of the employee's computer may be executed by a second monitoring program.

For instance, the systems and methods described herein may be configured to monitor activity in which the company's financial information is transmitted over the Internet. When the systems and methods described herein determine that a number of transmissions have occurred to third parties who are not recognized, the systems and methods described herein may intensify scrutiny placed upon a particular computer and/or employee that uses the particular computer. In another example of the heightened search, an employee may have been reported on by another employee as having been drunk at work, which generates an alert. The systems and methods described herein may be actuated to search the employee's social profiling network and status for keywords relating to alcohol consumption or use to determine if the employee has a drinking problem.

With reference now to FIG. 16, alerts are generated and may be accessed by clicking on the alerts tab. As shown, Mr. Lucas has a drug-related alert, Ms. Smith a public disturbance alert, and Mr. Kirk a property-related alert. As shown, the systems and methods described herein may provide a confidence level for the type of alert being generated. For example, the public disturbance alert is provided with a high confidence level, as is the drug related alert. However, the property related alert is provided with a medium confidence level. The confidence level can be assigned based upon the likelihood that a disclosure of said alert outside of authorized personnel would damage the company by subjecting the company to a law suit.

With reference now to FIG. 17, the alert for Mr. Lucas has been actuated and thus the details relating to Mr. Lucas's alert are provided (e.g., as a report). The alert relates to an arrest and the information shown includes the charge, the location, when Mr. Lucas was booked and released, and whether or not he is on parole.

With reference now to FIG. 18, an example of the incidents page is provided. The incidents are generated by peer-to-peer reporting and are classified among a plurality of classifications to include financial, criminal, civil, company systems/information technology use, and social media use. The incident is given a severity rating wherein the severity rating relates to the potential at which such information may affect the security of the company.

Figure 19:
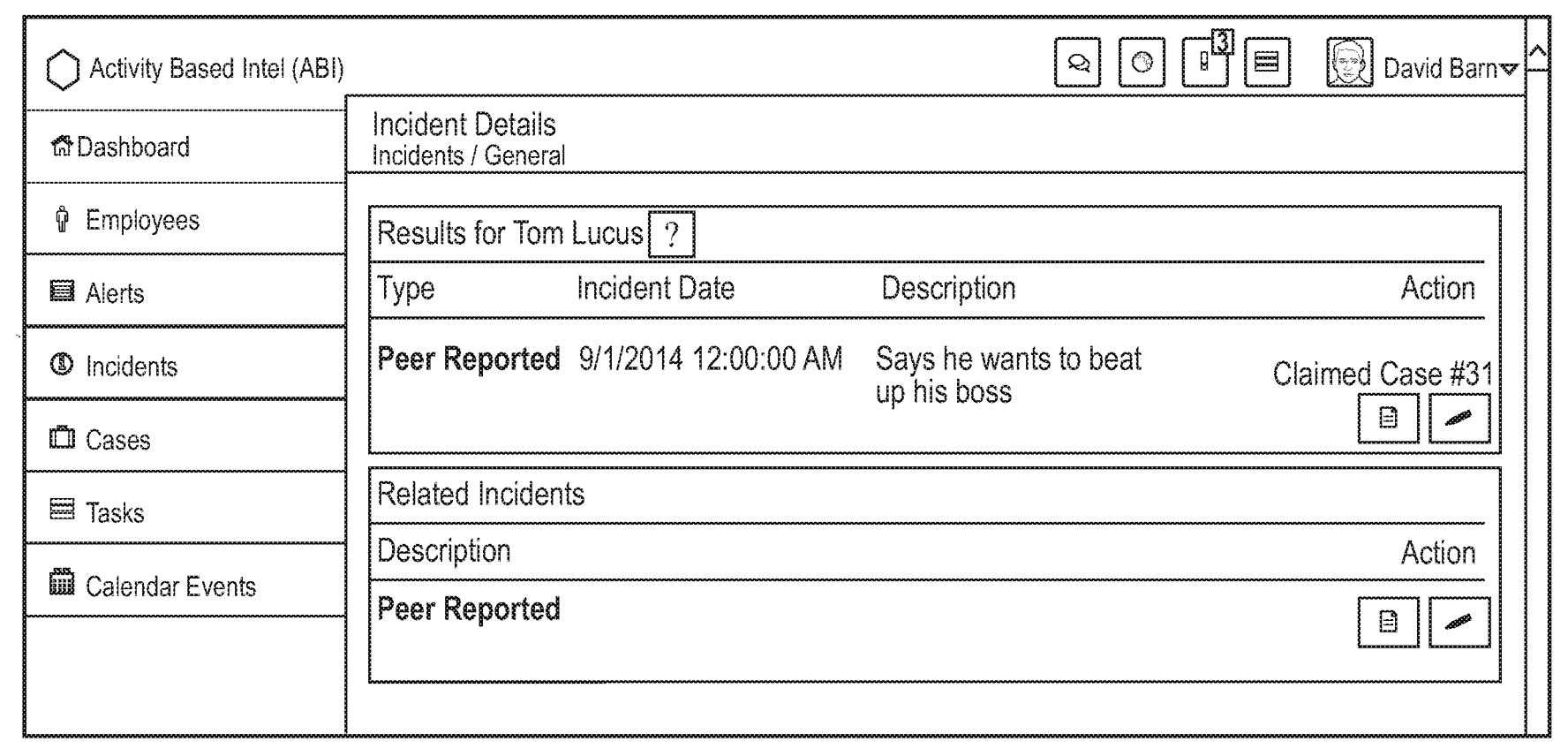

With reference now to FIG. 19, the page for Mr. Lucas's incident is provided. As disclosed, it is a peer-reported incident and the date of the incident is provided as well as a description of the case.

Figure 20:
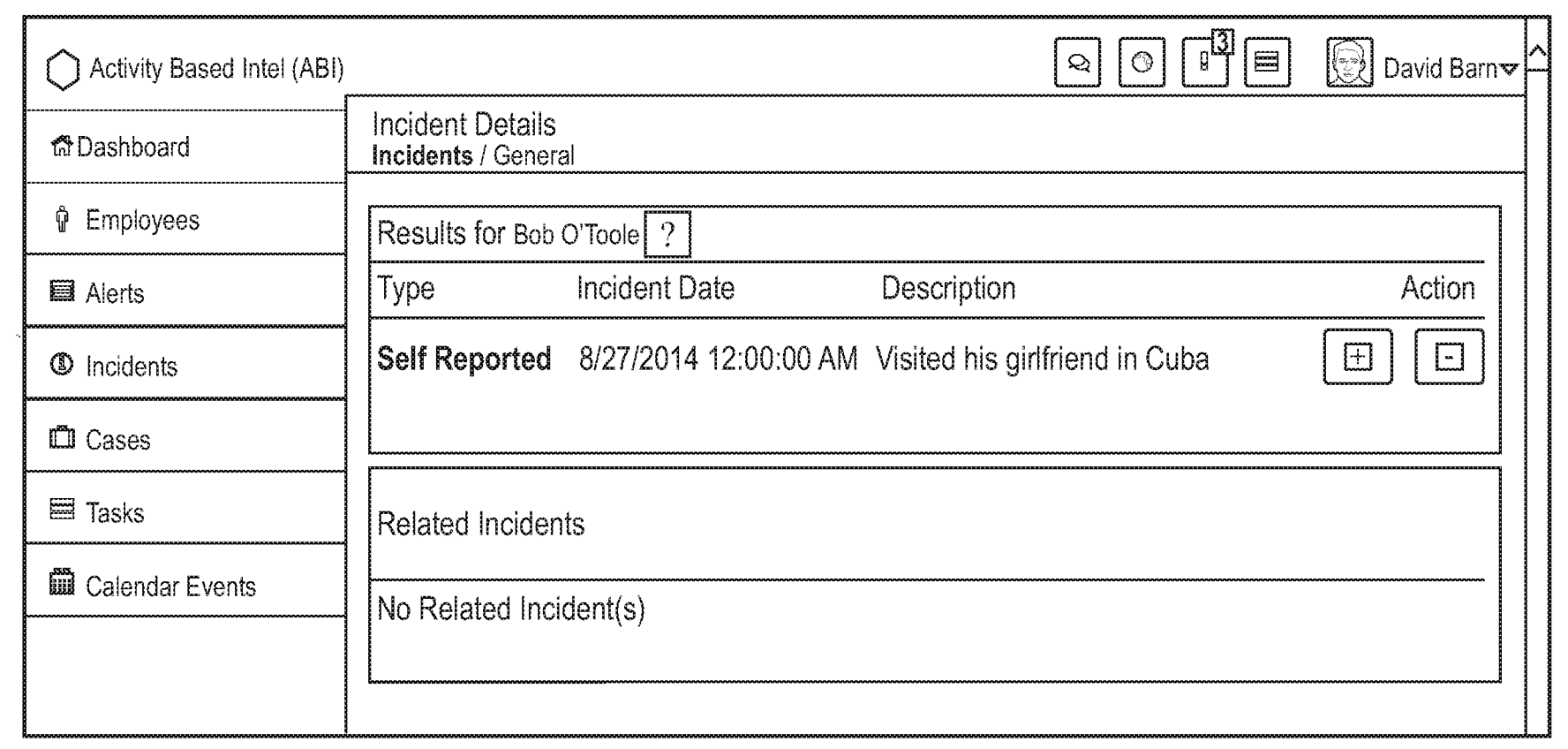

With reference now to FIG. 20, the incident page is provided. The incident tab provides a report for Bob O'Toole. As disclosed, this is a self-reported incident which again provides the date and a description. FIG. 20 further illustrates that an incident may be generated not only by peer-to-peer reporting, but also self-reporting.

With reference now to FIG. 21, the cases tab page is provided. The cases tab page provides a list of all the cases pending. As shown, the cases are assigned an ID number and the risk is associated with each case as well as the type of case generating the risk or alert. For example, Susan Sharp has a criminal-type case whereas Bob O'Toole is has technical case. The page may be prioritized by case number, risk, last edited by, or type.

With reference now to FIGS. 22A and 22B, the case of Mr. Lucas has been actuated. As shown, the case provides a history of what has taken place by the company. In this instance a mini-investigation has been conducted wherein specific tasks to be completed are set out for an individual administering Mr. Lucas's case. The first step is determining the employee status. The second step is an initial review which includes reviewing information about the incident and the employee. Step three is reviewing an arrest record where applicable. With respect to arrests, FIGS. 23 and 24 show the middle and bottom of the case page for Mr. Lucas. FIG. 23 shows that steps 4, 5, 6, and 7 relate to contacting the arrest officer, the attorneys involved, any witnesses, and conducting an Internet search. With reference now to FIG. 24, steps 8, 9, and 10 are provided wherein in step 8 the Employee is interviewed and in step 9 findings are prepared, and in step 10 a determination is made.

With reference now to FIG. 25, an illustrative view of a task list tab is shown. The task list tab shows the various tasks remaining for the user. As shown, the tasks may be divided into specific groups such as administrative, complete adjudication, or other. The task list also includes the subject matter, the due date, and the priority. It should be appreciated that each of the classifications, that is the type, subject, due date, and priority, may be filtered as indicated by the up-down arrow or a keyword search may be done.

It should now be understood that the systems and methods described herein monitor online and offline activity of one or more target employees, and based on the information that is received (as well as subsequently received information), determine whether anomalies exist that might indicate that a target employee poses a risk to the organization, and generate an alert. The anomalies are determined using legally Protected Information, but when the alert is generated, it does not contain any of the legally Protected Information, nor is the legally Protected Information used for the purposes of responding to the alert. The alert is presented via one or more user interfaces to one or more specific users for the purposes of reviewing the alert, reviewing an incident that precipitated the anomaly and the alert and taking action.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining whether monitored activity on a network poses a risk to an organization, the method comprising:
   electronically monitoring, by an employee monitoring/watch interface of a web application layer executed by at least one computing device, employee activities of a plurality of employees at substantially the same time;
   receiving, by an employee processing interface of the web application layer executed by the at least one computing device, subject data relating to an employee to be investigated based on an event resulting from the monitoring of the employee activities;
   receiving, by an external data layer executed by the at least one computing device, legal activity data from one or more legal databases, the legal activity data comprising information regarding legal activity relating to the employee;
   receiving, by the external data layer executed by the at least one computing device, financial activity data from one or more financial databases, the financial activity data comprising financial activity relating to the employee;
   receiving, by the employee monitoring/watch interface of the web application layer executed by the at least one computing device, electronic activity data relating to one or more activities electronically conducted by the employee on a network communicatively coupled to the at least one computing device, the electronic activity data generated in response to the electronic monitoring of an electronic device being operated by the employee on the network, the electronic activity data including data relating to operation of the electronic device by the employee;
   receiving, by the external data layer executed by the at least one computing device, social networking data from one or more social networking databases, the social networking data comprising social networking activity conducted by the employee;
   aggregating, by a microservices layer in communication with the web application layer and the external data layer and executed by the at least one computing device, the legal activity data, the financial activity data, the electronic activity data, and the social networking data into an employee profile relating to the employee;
   determining, by the microservices layer executed by the at least one computing device, legally Protected Information regarding the employee from the employee profile;
   configuring a client presentation software layer of the at least one computing device to prohibit provisioning of the legally Protected Information to a user via the client presentation software layer, wherein the client presentation software layer includes a private user interface that generates a plurality of security user interfaces for controlled access to information about the employee, each of the plurality of security user interfaces based on a class of a user desiring to access the information about the employee;
   generating, by an analytics service of the microservices layer executed by the at least one computing device, a behavior model based on at least one of the social networking data, the legal activity data, the financial activity data, and the electronic activity data, wherein the behavior model generates data associated with typical behavior for the target employee;
   determining, by the microservices layer executed by the at least one computing device, one or more anomalies associated with the employee based on the employee profile and the behavior model; and
   generating, by the at least one computing device, an alert relating to the one or more anomalies, wherein the alert does not contain references to the legally Protected Information.

2. The method of claim 1, further comprising:
   transmitting, by the at least one computing device, a request to consent to monitoring to the employee; and
   determining, by the at least one computing device, whether consent has been received in response to the request.

3. The method of claim 1, wherein electronically monitoring comprises at least one of:
   conducting, by the at least one computing device, a scrape of the Internet for information regarding the employee; or
   receiving, by the at least one computing device, information specific to the employee from one or more third party devices.

4. The method of claim 1, wherein electronically monitoring comprises providing, by the at least one computing device, information to a data source regarding the employee such that the data source automatically pushes employee-related information whenever it is available.

5. The method of claim 1, wherein electronically monitoring comprises providing, by the at least one computing device, information to a data source regarding the employee at a particular interval and receiving updated information regarding the employee.

6. The method of claim 1, wherein the behavior model is generated based on at least one of a property owned by the employee, information regarding utilities used by the employee, information regarding travel completed by the employee, information regarding a club membership held by the employee, information regarding a group membership held by the employee, information regarding a subscription held by the employee, information regarding a previous employment of the employee, information regarding a publication made by the employee, information regarding a license held by the employee, or information regarding a registration held by the employee.

7. The method of claim 1, further comprising:
   determining, by the at least one computing device, that the employee poses a risk to an organization based on the one or more anomalies; and
   generating, by the at least one computing device, a risk assessment report that indicates a determined risk, information about the determined risk, how the determined risk was determined, how the determined risk might potentially affect the organization, and how the determined risk may be mitigated.

8. The method of claim 7, wherein generating the risk assessment report further comprises:

generating, by the at least one computing device, one or more instructions for responding to the alert based on the determined risk; and transmitting the one or more instructions to one or more designated computers or one or more employees designated for receiving the risk assessment report.

9. The method of claim 1, wherein the electronic activity data includes keystrokes, clicks, electronic mail transmissions, websites visited, files that are downloaded locally onto a device, and/or the like.

10. The method of claim 1, wherein electronically monitoring includes monitoring at least one of browsing history, file transfer history, file editing history, communications data, keylogging, keystroke data, mouse click data, screen shot data, peripheral device access data, or video data.

* * * * *